United States Patent
Lin et al.

(10) Patent No.: US 9,996,371 B2
(45) Date of Patent: Jun. 12, 2018

(54) VIRTUAL SWITCHING METHOD, RELATED APPARATUS, AND COMPUTER SYSTEM

(71) Applicant: Huawei Technologies Co., Ltd., Shenzhen (CN)

(72) Inventors: Yang Lin, Beijing (CN); Kun Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 577 days.

(21) Appl. No.: 14/486,246

(22) Filed: Sep. 15, 2014

(65) Prior Publication Data

US 2015/0026681 A1    Jan. 22, 2015

Related U.S. Application Data

(63) Continuation of application No. PCT/CN2014/072502, filed on Feb. 25, 2014.

(30) Foreign Application Priority Data

Jun. 28, 2013 (CN) .......................... 2013 1 0270272

(51) Int. Cl.
   *G06F 15/177* (2006.01)
   *G06F 9/455* (2018.01)
   (Continued)

(52) U.S. Cl.
   CPC ...... *G06F 9/45533* (2013.01); *G06F 9/45558* (2013.01); *G06F 2009/45579* (2013.01);
   (Continued)

(58) Field of Classification Search
   CPC ............. G06F 9/45533; G06F 9/45558; G06F 2009/45595; G06F 2009/4557; G06F 2009/45579; H04L 49/70; H04L 41/0806
   See application file for complete search history.

(56) References Cited

U.S. PATENT DOCUMENTS

| 2005/0114855 A1 | 5/2005 | Baumberger |
| 2007/0220217 A1 | 9/2007 | Shankara |

(Continued)

FOREIGN PATENT DOCUMENTS

| CN | 1916855 A | 2/2007 |
| CN | 101630270 A | 1/2010 |

(Continued)

OTHER PUBLICATIONS

Tanyingyong et al. "Using Hardware Classification to Improve PC-Based OpenFlow Switching". 2011 IEEE 12th International Conference on High Performance Switching and Routing. pp. 215-221. 2011.*

(Continued)

*Primary Examiner* — John M MacIlwinen
(74) *Attorney, Agent, or Firm* — Conley Rose, P.C.

(57) ABSTRACT

A virtual switching method, a related apparatus, and a computer system are provided. The method includes receiving a first message sent by a source node, where the first message is used to request a first virtual machine to perform switching processing on to-be-switched data, where the to-be-switched data is sent from the source node to a target node and at least one of the source node and the target node is a second virtual machine; and determining a second message according to an address of the target node contained in the to-be-switched data and a configured port mapping table, and sending the second message, where the second message is used to instruct the target node to acquire the to-be-switched data from a storage device of a hardware layer.

18 Claims, 11 Drawing Sheets

(51) Int. Cl.
*H04L 12/24* (2006.01)
*H04L 12/931* (2013.01)

(52) U.S. Cl.
CPC ... *G06F 2009/45595* (2013.01); *H04L 41/0806* (2013.01); *H04L 49/70* (2013.01)

(56) References Cited

U.S. PATENT DOCUMENTS

| | | | |
|---|---|---|---|
| 2008/0086729 A1* | 4/2008 | Kondoh | G06F 9/5077 718/1 |
| 2009/0268608 A1 | 10/2009 | Lobig et al. | |
| 2010/0054129 A1 | 3/2010 | Kuik et al. | |
| 2010/0217916 A1* | 8/2010 | Gao | G06F 12/109 711/6 |
| 2011/0320632 A1 | 12/2011 | Karino | |
| 2012/0110578 A1 | 5/2012 | Yang | |
| 2013/0332927 A1 | 12/2013 | Tang et al. | |

FOREIGN PATENT DOCUMENTS

| | | |
|---|---|---|
| CN | 101819564 A | 9/2010 |
| CN | 102103518 A | 6/2011 |
| CN | 102132511 A | 7/2011 |
| CN | 102648455 A | 8/2012 |
| CN | 103095546 A | 5/2013 |
| CN | 103346981 A | 10/2013 |
| WO | 2012114398 A1 | 8/2012 |

OTHER PUBLICATIONS

McKeown, N., et al., "OpenFlow: Enabling Innovation in Campus Networks," ACM SIGCOMM, Computer Communication Review, vol. 38, No. 2, Apr. 2008, pp. 69-74.

Foreign Communication From a Counterpart Application, European Application No. 14818411.2, Extended European Search Report dated May 9, 2016, 8 pages.

Partial English Translation and Abstract of Chinese Patent Application No. CN103346981A, Sep. 12, 2014, 15 pages.

Foreign Communication From a Counterpart Application, PCT Application No. PCT/CN2014/072502, International Search Report dated Jun. 11, 2014, 7 pages.

Foreign Communication From a Counterpart Application, PCT Application No. PCT/CN2014/072502, Written Opinion dated Jun. 11, 2014, 5 pages.

Foreign Communication From a Counterpart Application, Chinese Application No. 201310270272.9, Chinese Search Report dated Aug. 10, 2015, 2 pages.

Foreign Communication From a Counterpart Application, Chinese Application No. 201310270272.9, Chinese Office Action dated Sep. 7, 2015, 8 pages.

Wu, W., et al., "The performance analysis of linux networking—Packet receiving," XP005895784, Computer Communications 30, Elsevier, Science Direct, Nov. 27, 2006, pp. 1044-1057.

Foreign Communication From a Counterpart Application, European Application No. 14818411.2, European Oral Proceedings dated Feb. 27, 2018, 9 pages.

* cited by examiner

VIRTUAL SWITCHING METHOD, RELATED APPARATUS, AND COMPUTER SYSTEM

CROSS-REFERENCE TO RELATED APPLICATION

This application is a continuation of International Application No. PCT/CN2014/072502, filed on Feb. 25, 2014, which claims priority to Chinese Patent Application No. 201310270272.9, filed on Jun. 28, 2013, both of which are hereby incorporated by reference in their entireties.

TECHNICAL FIELD

The present invention relates to the field of computer technologies, and in particular, to a virtual switching method, a related apparatus, and a computer system.

BACKGROUND

Network virtualization is a manner of separating, by using the software-based abstract, network traffic from a physical network element. Network virtualization and virtualization of other forms have a lot in common.

For network virtualization, network traffic of a switch, a network port, a router, and other physical elements in a network is abstractly isolated. Each physical element is replaced by a virtual representation form of a network element. An administrator can configure a virtual network element to meet its unique need. A main advantage of network virtualization herein is that a plurality of physical networks is integrated into a larger logical network.

Existing main network virtualization schemes are Open Virtual Switch (OVS) and Distributed Virtual Switch (DVS) of VMware®. For a mainstream OVS architecture, a virtual switch (vSwitch) is implemented in a Host kernel, that is, the virtual switch is implemented in a Virtual Machine Monitor (VMM) kernel. The virtual switch is in a core position of a virtual network and its architecture is shown in FIG. 1, where the vSwitch uses a virtual port and is connected to a virtual machine (VM) and an underlying network interface card (NIC) through a front-end (FE)/back-end (BE). The Host allocates physical resources such as a central processing unit (CPU) and memory to a virtual machine and all types of virtual hardware running on the host. These physical resources are classified into physical resources of a kernel space and physical resources of a user space. In a switching process, the vSwitch needs to apply for and occupy many physical resources in Host kernel space, which is especially unfavorable for the Host to perform management and resource allocation on the virtual network. The vSwitch undertakes lots of tasks and functions, for example, virtual local area network (VLAN), load-balance, tunneling, security, Link Aggregation Control Protocol (LACP), and quality of service (QoS), as shown in FIG. 1. Design of the vSwitch is very huge and complicated. The vSwich and a Host kernel are tightly coupled, resulting in poor scalability and flexibility of the vSwitch and the entire virtual network.

SUMMARY

Embodiments of the present invention provide a virtual switching method, a related apparatus, and a computer system, so as to separate a virtual switching function from a kernel to improve scalability and flexibility of a virtual switching device, and to deploy the virtual switching function on a virtual machine (VM) to form peer nodes with a common virtual machine, thereby facilitating a Host to manage a virtual network and efficiently and reasonably allocate a resource.

According to a first aspect, a virtual switching method is provided, where the method is applied to a computing node and the computing node includes a hardware layer, a Host running on the hardware layer, and at least one VM running on the Host, where the hardware layer includes an input/output (I/O) device and a storage device, the at least one VM includes a first virtual machine having a virtual switching function, and the at least one VM further includes a second virtual machine, and the method includes receiving, by the first virtual machine, a first message sent by a source node, where the first message is used to request the first virtual machine to perform switching processing on to-be-switched data, where the to-be-switched data is sent from the source node to a target node and at least one of the source node and the target node is the second virtual machine; and determining, by the first virtual machine, a second message according to an address of the target node contained in the to-be-switched data and a configured port mapping table, and sending the second message, where the second message is used to instruct the target node to acquire the to-be-switched data from the storage device of the hardware layer.

With reference to the first aspect, in a first implementation manner of the first aspect, before the receiving, by the first virtual machine, a first message sent by a source node, the method further includes receiving, by the first virtual machine, a configuration command sent by the Host; configuring, by the first virtual machine according to the configuration command, a first virtual port, which is used to communicate with the second virtual machine, of the first virtual machine and a second virtual port, which is used to communicate with the I/O device, of the first virtual machine; and establishing, by the first virtual machine, a mapping relationship between the first virtual port and the second virtual port, so as to generate the port mapping table.

With reference to the first aspect and the foregoing implementation manner of the first aspect, in a second implementation manner of the first aspect, after the receiving a configuration command sent by the Host, the method further includes configuring, by the first virtual machine according to the configuration command, first share memory corresponding to the second virtual machine, where the first share memory is a specified storage area on the storage device of the hardware layer.

With reference to the first aspect and the foregoing implementation manner of the first aspect, in a third implementation manner of the first aspect, when the source node is the second virtual machine and the target node is the I/O device, the receiving, by the first virtual machine, a first message sent by a source node includes receiving, by the first virtual machine through the first virtual port, the first message sent by the second virtual machine, where the first message includes a writing completion interrupt which indicates, to the first virtual machine, that the second virtual machine has written the to-be-switched data into the first share memory; and the determining, by the first virtual machine, a second message according to an address of the target node contained in the to-be-switched data and a configured port mapping table, and sending the second message includes: determining, by the first virtual machine, an address of the corresponding first share memory according to the first virtual port used to receive the first message; acquiring the to-be-switched data from the first share memory and determining, according to an address of the I/O device contained in the to-be-switched data, the second virtual port corresponding to the I/O device from the port mapping table; and determining the second message containing the address of the first share memory and a reading instruction, and sending the second message to the I/O device through the second virtual port, so that the I/O device reads the to-be-switched data from the first share memory.

With reference to the first aspect and the foregoing implementation manner of the first aspect, in a fourth implementation manner of the first aspect, when the source node is the I/O device and the target node is the second virtual machine, after the receiving, by the first virtual machine, a first message sent by a source node, the method further includes acquiring, by the first virtual machine from the I/O device, the address of the target node contained in the to-be-switched data, where the address of the target node is an address of the second virtual machine; and the determining, by the first virtual machine, a second message according to an address of the target node contained in the to-be-switched data and a configured port mapping table, and sending the second message includes determining, by the first virtual machine by querying the port mapping table according to the address of the second virtual machine, the first virtual port corresponding to the second virtual machine and determining an address of the first share memory corresponding to the second virtual machine; sending, through the second virtual port corresponding to the I/O device, a reply message containing the address of the first share memory to the I/O device, so that the I/O device writes the to-be-switched data into the first share memory according to the reply message; and, when the first virtual machine receives, from the I/O device, a writing completion interrupt which indicates, to the first virtual machine, that the I/O device has written the to-be-switched data into the first share memory, determining the second message containing a reading instruction and sending, through the first virtual port, the second message to the second virtual machine, so that the second virtual machine reads the to-be-switched data from the first share memory.

With reference to the first aspect and the foregoing implementation manner of the first aspect, in a fifth implementation manner of the first aspect, the at least one VM further includes a third virtual machine; and when the source node is the second virtual machine and the target node is the third virtual machine, the receiving, by the first virtual machine, a first message sent by a source node includes receiving, by the first virtual machine through the first virtual port, the first message sent by the second virtual machine, where the first message includes a writing completion interrupt which indicates, to the first virtual machine, that the second virtual machine has written the to-be-switched data into second share memory that the second virtual machine pre-negotiates, through the first virtual machine, with the third virtual machine, where the second share memory is a specified storage area on the storage device of the hardware layer; and the determining, by the first virtual machine, a second message according to an address of the target node contained in the to-be-switched data and a configured port mapping table, and sending the second message includes determining, by the first virtual machine according to the first virtual port used to receive the first message, an address of the second virtual machine corresponding to the first virtual port; determining an address of the second share memory according to the address of the second virtual machine and an address of the third virtual machine contained in the to-be-switched data; and determining the second message containing the address of the second share memory and a reading instruction, and sending the second message to the third virtual machine, so that the third virtual machine reads the to-be-switched data from the second share memory.

With reference to the first aspect and the foregoing implementation manners of the first aspect, in a sixth implementation manner of the first aspect, the method further includes receiving reading completion indication information sent by the target node, so as to release the first share memory or the second share memory.

With reference to the first aspect and the foregoing implementation manners of the first aspect, in a seventh implementation manner of the first aspect, after the receiving, by the first virtual machine, a first message sent by a source node, the method further includes determining, by the first virtual machine according to the address of the target node contained in the to-be-switched data, an entry matching the address of the target node in a configured Openflow flowtable, where the Openflow flowtable includes at least one entry and the entry includes an address, a virtual port, and an execution action parameter; if the matched entry exists, processing, by the first virtual machine, the to-be-switched data according to the execution action parameter, which is in the matched entry, corresponding to the address of the target node; and if the matched entry does not exist, creating, by the first virtual machine, a new entry that can match the to-be-switched data and inserting the new entry into the Openflow flowtable.

According to a second aspect, a host is provided, including a creating module configured to, after an I/O virtual function of an input/output I/O device is enabled, generate at least one virtual machine VM on the Host, where the at least one VM includes a first virtual machine having a virtual switching function and the at least one VM further includes a second virtual machine; and a configuring module configured to send a configuration command to the first virtual machine, so that the first virtual machine configures, according to the configuration command, a first virtual port, which is used to communicate with the second virtual machine, of the first virtual machine and a second virtual port, which is used to communicate with the I/O device, of the first virtual machine.

According to a third aspect, a virtual machine is provided, where the virtual machine runs on a Host, where the Host runs on a hardware layer, where the hardware layer includes an I/O device and a storage device; and the virtual machine includes a receiving module configured to receive a first message sent by a source node, where the first message is used to request the virtual machine to perform switching processing on to-be-switched data, where the to-be-switched data is sent from the source node to a target node and at least one of the source node and the target node is a second virtual machine, where the second virtual machine runs on the Host; a switching processing module configured to determine a second message according to an address of the target node contained in the to-be-switched data and a port mapping table configured by the virtual machine, where the second message is used to instruct the target node to acquire the to-be-switched data from the storage device of the hardware layer; and a sending module configured to send the second message to the target node.

With reference to the third aspect, in a first implementation manner of the third aspect, the virtual machine includes an agent module configured to configure, according to a configuration command sent by the Host, a first virtual port, which is used to communicate with the second virtual machine, of the virtual machine and a second virtual port, which is used to communicate with the I/O device, of the virtual machine; and a generating module configured to establish a mapping relationship between the first virtual port and the second virtual port, so as to generate the port mapping table.

With reference to the third aspect and the foregoing implementation manner of the third aspect, in a second implementation manner of the third aspect, the Agent module is further configured to configure, according to the configuration command, first share memory corresponding to the second virtual machine, where the first share memory is a specified storage area on the storage device of the hardware layer.

With reference to the third aspect and the foregoing implementation manner of the third aspect, in a third implementation manner of the third aspect, the receiving module is specifically configured to receive the first message through the first virtual port, where the first message includes a writing completion interrupt which indicates, to the virtual machine, that the source node has written the to-be-switched data into the first share memory; the switching processing module is specifically configured to determine an address of the corresponding first share memory according to the first virtual port used to receive the first message; acquire the to-be-switched data from the first share memory and determine, according to the address of the target node contained in the to-be-switched data, the second virtual port corresponding to the target node from the port mapping table; and determine the second message containing the address of the first share memory and a reading instruction; the sending module is specifically configured to send the second message to the target node through the second virtual port; and the source node is the second virtual machine and the target node is the I/O device.

With reference to the third aspect and the foregoing implementation manner of the third aspect, in a fourth implementation manner of the third aspect, the receiving module is specifically configured to receive the first message sent by the source node; the switching processing module is specifically configured to acquire the address of the target node contained in the to-be-switched data; and determine, by querying the port mapping table according to the address of the target node, the first virtual port corresponding to the target node and determine an address of the first share memory corresponding to the target node; the sending module is specifically configured to send a reply message containing the address of the first share memory to the source node through the second virtual port corresponding to the source node; the switching processing module is further configured to, when a writing completion interrupt, which indicates, to the virtual machine, that the source node has written the to-be-switched data into the first share memory and is sent by the source node, is received, determine the second message containing a reading instruction; the sending module is further configured to send the second message to the target node through the first virtual port; the receiving module is further configured to receive the writing completion interrupt indicating that the source node has written the to-be-switched data into the first share memory and sent by the source node; and the source node is the I/O device and the target node is the second virtual machine.

With reference to the third aspect and the foregoing implementation manner of the third aspect, in a fifth implementation manner of the third aspect, the receiving module is specifically configured to receive, through the first virtual port, the first message sent by the source node, where the first message includes a writing completion interrupt; the switching processing module is specifically configured to determine, according to the first virtual port used to receive the first message, an address of the source node corresponding to the first virtual port; determine an address of second share memory according to the address of the source node and the address of the target node contained in the to-be-switched data; and determine the second message containing the address of the second share memory and a reading instruction; the sending module is specifically configured to send the second message to the target node; and the at least one VM further includes a third virtual machine, the source node is the second virtual machine, and the target node is the third virtual machine.

According to a fourth aspect, a computing node is provided, including a hardware layer, a Host running on the hardware layer, and at least one virtual machine VM running on the Host, where the hardware layer includes an input/output I/O device and a storage device, the at least one VM includes a first virtual machine having a virtual switching function, and the at least one VM further includes a second virtual machine, where the first virtual machine is configured to receive a first message sent by a source node, where the first message is used to request the first virtual machine to perform switching processing on to-be-switched data, where the to-be-switched data is sent from the source node to a target node and at least one of the source node and the target node is the second virtual machine; and the first virtual machine is further configured to determine a second message according to an address of the target node contained in the to-be-switched data and a configured port mapping table, and send the second message, where the second message is used to instruct the target node to acquire the to-be-switched data from the storage device of the hardware layer.

With reference to the fourth aspect, in a first implementation manner of the fourth aspect, the Host is configured to send a configuration command to the first virtual machine; the first virtual machine is further configured to configure, according to the configuration command, a first virtual port, which is used to communicate with the second virtual machine, of the first virtual machine and a second virtual port, which is used to communicate with the I/O device, of the first virtual machine; and the first virtual machine is further configured to establish a mapping relationship between the first virtual port and the second virtual port, so as to generate the port mapping table.

With reference to the fourth aspect and the foregoing implementation manner of the fourth aspect, in a second implementation manner of the fourth aspect, the first virtual machine is further configured to configure, according to the configuration command, first share memory corresponding to the second virtual machine, where the first share memory is a specified storage area on the storage device of the hardware layer.

With reference to the fourth aspect and the foregoing implementation manner of the fourth aspect, in a third implementation manner of the fourth aspect, the source node is configured to write the to-be-switched data into the first share memory; the source node is further configured to send the first message to the first virtual machine; the first virtual machine is specifically configured to receive the first message through the first virtual port, where the first message includes a writing completion interrupt which indicates, to the first virtual machine, the source node has written the to-be-switched data into the first share memory; determine an address of the corresponding first share memory according to the first virtual port used to receive the first message; acquire the to-be-switched data from the first share memory and determine, according to an address of the I/O device contained in the to-be-switched data, the second virtual port corresponding to the I/O device from the port mapping table; and determine the second message containing the address of the first share memory and a reading instruction, and send the second message to the target node through the second virtual port; the target node is configured to read the to-be-switched data from the first share memory according to the second message; and source node is the second virtual machine and the target node is the I/O device.

With reference to the fourth aspect and the foregoing implementation manner of the fourth aspect, in a fourth implementation manner of the fourth aspect, the first virtual machine is specifically configured to receive the first message sent by the source node and acquire the address of the target node contained in the to-be-switched data; determine, by querying the port mapping table according to the address of the target node, the first virtual port corresponding to the target node and determine an address of the first share memory corresponding to the target node; send a reply message containing the address of the first share memory to the source node through the second virtual port corresponding to the source node; and, when a writing completion interrupt, which indicates, to the first virtual machine, that the source node has written the to-be-switched data into the first share memory and sent by the source node, is received, determine the second message containing a reading instruction and send the second message to the target node through the first virtual port; the source node is further configured to write the to-be-switched data into the first share memory according to the address of the first share memory in the reply message; the source node is further configured to send the writing completion interrupt indicating that the source node has written the to-be-switched data into the first share memory to the first virtual machine; the target node is configured to read the to-be-switched data from the first share memory according to the second message; and the source node is the I/O device and the target node is the second virtual machine.

With reference to the fourth aspect and the foregoing implementation manner of the fourth aspect, in a fifth implementation manner of the fourth aspect, the source node is further configured to write the to-be-switched data into second share memory that the source node pre-negotiates, through the first virtual machine, with the target node, where the second share memory is a specified storage area on the storage device of the hardware layer; the source node is further configured to send the first message to the first virtual machine through the first virtual port, where the first message includes a writing completion interrupt; the first virtual machine is specifically configured to determine, according to the first virtual port used to receive the first message, an address of the source node corresponding to the first virtual port; determine an address of the second share memory according to the address of the source node and the address of the target node contained in the to-be-switched data; and determine the second message containing the address of the second share memory and a reading instruction, and send the second message to the target node; the target node is configured to read the to-be-switched data from the second share memory according to the second message; and the at least one VM further includes a third virtual machine, the source node is the second virtual machine, and the target node is the third virtual machine.

With reference to the fourth aspect and the foregoing implementation manners of the fourth aspect, in a sixth implementation manner of the fourth aspect, after the target node reads the to-be-switched data from the share memory according to the second message, the target node is further configured to send reading completion indication information to the first virtual machine, so as to release the first share memory or the second share memory; and the first virtual machine is further configured to release the first share memory or the second share memory.

With reference to the fourth aspect and the foregoing implementation manners of the fourth aspect, in a seventh implementation manner of the fourth aspect, after the first message sent by the source node is received, the first virtual machine is further configured to determine, according to the address of the target node contained in the to-be-switched data, an entry matching the address of the target node in a configured Openflow flowtable, where the Openflow flowtable includes at least one entry and the entry includes an address, a virtual port, and an execution action parameter; if the matched entry exists, process the to-be-switched data according to the execution action parameter, which is in the matched entry, corresponding to the address of the target node; and if the matched entry does not exist, create a new entry that can match the to-be-switched data and insert the new entry in the Openflow flowtable.

According to a fifth aspect, a computer system is provided, including at least one computing node according to the fourth aspect.

It can be seen from the foregoing descriptions that, in the embodiments of the present invention, a computing node includes a hardware layer, a Host running on the hardware layer, and at least one VM running on the Host, where the hardware layer includes an I/O device and a storage device, the at least one VM includes a first virtual machine having a virtual switching function, and the at least one VM further includes a second virtual machine. In this way, by implementing the virtual switching function on the virtual machine, the virtual switch has a same priority as a common VM, so as to form a peer network virtualization architecture. During resource allocation, the virtual switch uses a physical resource in user space like the common VM, which facilitates the Host to perform management and efficiently and reasonably allocate a bandwidth, CPU, or storage resource. A virtual switching method applied to the computing node includes receiving, by the first virtual machine, a first message sent by a source node, where the first message is used to request the first virtual machine to perform switching processing on to-be-switched data, where the to-be-switched data is sent from the source node to a target node and at least one of the source node and the target node is the second virtual machine; and determining, by the first virtual machine, a second message according to an address of the target node contained in the to-be-switched data and a configured port mapping table, and sending the second message, where the second message is used to instruct the target node to acquire the to-be-switched data from the storage device of the hardware layer. According to the method, the virtual switching function is separated and decoupled from a Host kernel, which decreases a degree of coupling with the Host and allows deployment of a plurality of vSwitches on a same Host without being restricted by the Host, thereby featuring more powerful scalability. After decoupling, the vSwitch does not depend on an operating system in the Host kernel any longer and can be deployed more easily, thereby featuring better transplantability. In addition, a configuring module (agent) is separated from a to-be-switched data switching and forwarding module (a port mapping table), thereby better meeting a requirement of a software-defined network.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
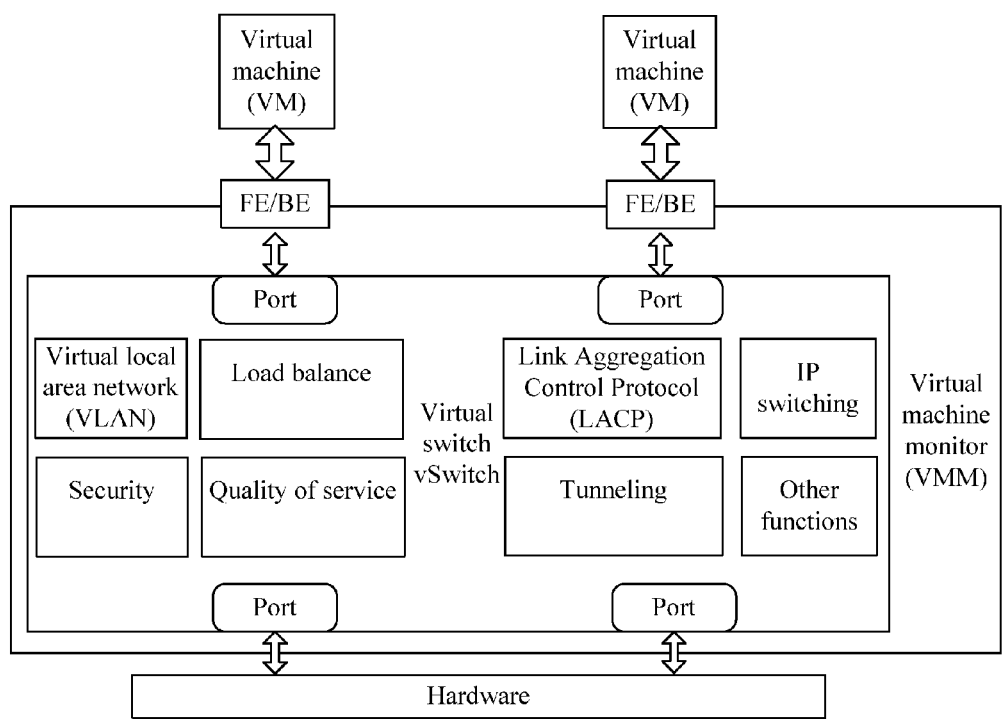
FIG. 1 is an architecture diagram of OVS in the prior art.

The following clearly and completely describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

For the convenience of understanding the embodiments of the present invention, several terms introduced in description of the embodiments of the present invention are firstly described herein.

Virtual Machine VM:

One or more virtual machines can be simulated on one physical computer by using virtual machine software, and these virtual machines work just like real computers. An operating system and an application program can be installed on a virtual machine, and the virtual machine may further access a network resource. For an application program running on a virtual machine, the virtual machine works just like a real computer.

Hardware Layer:

A hardware layer is a hardware platform running in a virtualized environment. The hardware layer may include a plurality of types of hardware. For example, a hardware layer of a computing node may include a CPU and memory, and may further include a high-speed/low-speed input/output (I/O) device such as a network interface card (NIC) and a storage. The NIC is an underlying physical network interface card and is called a Host NIC for short in the following to be differentiated from a virtual network interface card (virtual NIC) of a virtual machine.

Host:

As a management layer, a Host is configured to manage and allocate a hardware resource, present a virtual hardware platform for a virtual machine, and implement virtual machine scheduling and isolation. The Host may be a virtual machine monitor (VMM), or sometimes, the Host may be formed by a VMM and one privileged virtual machine by means of cooperation. The virtual hardware platform provides all types of hardware resources for each virtual machine running on the virtual hardware platform, for example, provides a virtual CPU, memory, a virtual disk, a virtual network interface card. The virtual disk may correspond to one file of the Host or one logical block device. A virtual machine runs on a virtual hardware platform that the Host prepares for the virtual machine. One or more virtual machines run on the Host.

Virtual Switch (vSwitch):

Under control of a Host, a virtual switch implements mutual connection between virtual machines and connects the virtual machines to a physical network. The virtual switch works just like a real virtual machine. An existing virtual switch is implemented in a Host kernel, is in a core position of a virtual network, and undertakes many functions such as virtual local area network (VLAN), load-balance, tunneling, security, Link Aggregation Control Protocol (LACP), and quality of service (QoS).

Memory Sharing:

As a mechanism of inter-process communication (IPC) in an operating system, memory sharing is one of simplest manners in inter-process communication. Memory sharing allows two or more processes to access same memory. In network virtualization, memory sharing allows two or more virtual machines and virtual hardware to access same memory. Memory sharing has highest efficiency among various inter-process communication manners.

Zero-Copy:

Zero-copy is a technology that prevents a CPU from copying data from one storage to another storage. By reducing or eliminating an operation, which affects a rate, on a key communication path, zero-copy reduces an overhead of data transmission, thereby effectively improving communication performance and implementing high-speed data transmission. Zero-copy may be implemented by using a manner such as I/O cut-through and MMAP.

Software-Defined Network (SDN):

An SDN is a new-generation network architecture. A core technology Openflow of the SDN separates a control plane from a data plane for a network device, thereby implementing flexible control over network traffic and providing a good platform for innovation of a core network and an application.

Figure 2:
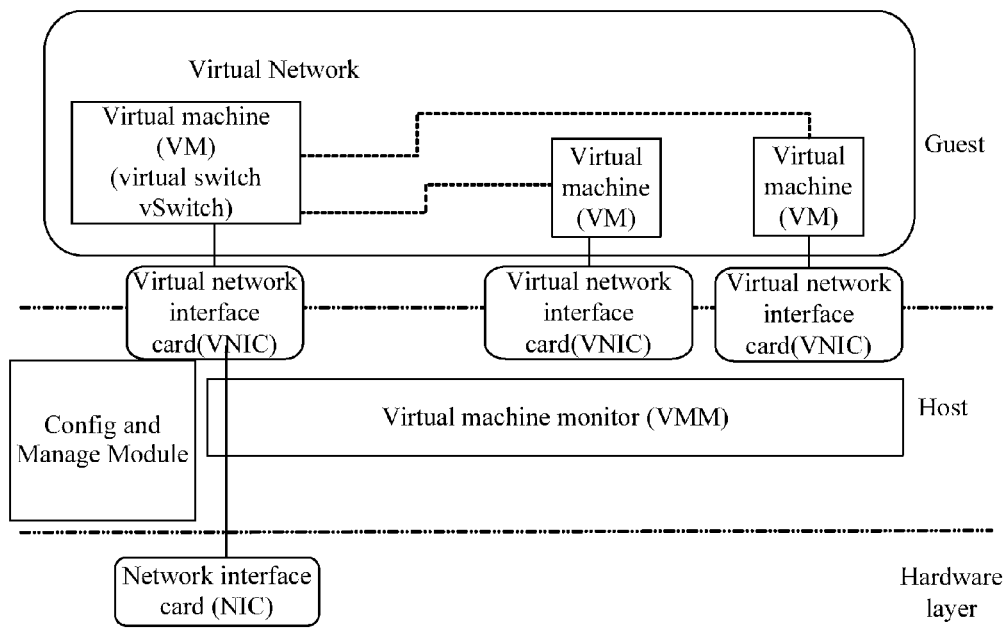
FIG. 2 is a schematic architecture diagram of a virtualized software and hardware system according to an embodiment of the present invention.

FIG. 2 shows a schematic architecture diagram of a software and hardware system of a virtualization scheme of deploying a vSwitch on a VM according to an embodiment of the present invention. The system architecture mainly includes three hierarchies: a hardware layer, a Host, and a virtual machine (VM). The hardware layer includes an I/O device, namely, a physical network interface card (NIC). The hardware layer may communicate with another external Host or network through the NIC. The hardware layer may further include a storage device such as memory and a hard disk. The Host runs on the hardware layer. The Host may be a virtual machine monitor (VMM), or sometimes, the Host may be formed by a VMM and one privileged virtual machine by means of cooperation. FIG. 2 shows the second case. However, this is merely used as an example, and is not limited by the present invention. One VM of at least one virtual machine (VM) running on the Host is a virtual machine having a virtual switching function (a first virtual machine) in the present invention. In addition, the at least one VM may further include several common virtual machines (such as a second virtual machine and a third virtual machine).

In a process of creating a virtual network environment based on the system architecture, a configuration and management module (CMM) in the Host may send a configuration command to the first virtual machine having a virtual switching function (vSwitch) to configure the virtual network environment and the vSwitch. Specifically, the CMM may perform configuration through a configuration agent module in the vSwitch, including management and configuration on a port mapping table, a VLAN table, an Access Control List (ACL), and the like. The configuration and management module in the Host may be connected to the agent module in the vSwitch by using IPC (such as IOCTL, NETLINK, and SOCKET), so that a configuration of a virtual environment of the Host may be transmitted to the vSwitch and may specifically include configuration information such as a Host NIC, a back-end of a VM, share memory, and a DMA interrupt to enable the vSwitch to acquire virtual environment information, thereby creating the corresponding virtual network environment.

Specifically, after a VM is created, the configuration and management module may create a virtual NIC interface for the VM. After that, through the agent module, the configuration and management module may negotiate a communication mechanism (a communication manner) and a port mapping between the vSwitch and the Host NIC, as well as a communication mechanism (a communication manner) and a port mapping between the vSwitch and a VMM NIC, and may further negotiate share memory between the vSwitch and the VMM NIC, and the like. The vSwitch may communicate with the Host NIC by using a manner such as IO cut-through and zero-copy. The vSwitch may communicate with the VM by using a technology such as memory sharing and a front-end (FE)/back-end (BE) event channel. An entry is created according to a correspondence between various negotiated configurations, so as to generate a mapping table. For example, a correspondence among an address of a VM, a port number of a virtual port of a vSwitch corresponding to the VM, and an address of share memory negotiated between the VM and the vSwitch is established to form an entry, where the VM is a common virtual machine, for example, a second virtual machine.

After the virtual network environment is created, during data switching, the first virtual machine (vSwitch) is configured to receive a first message sent by a source node, where the first message is used to request the first virtual machine to perform switching processing on to-be-switched data, where the to-be-switched data is sent from the source to a target node and at least one of the source node and the target node is the second virtual machine. The first virtual machine is further configured to determine a second message according to an address of the target node contained in the to-be-switched data and a configured port mapping table, and send the second message, where the second message is used to instruct the target node to acquire the to-be-switched data from the storage device of the hardware layer. Therefore, forwarding of the to-be-switched data is implemented by means of signaling control and switching processing of the vSwitch. In this way, a virtual switching function is separated and decoupled from a Host kernel and the virtual switching function is implemented on a virtual machine instead, which simplifies design of the Host kernel and reduces a burden of the Host kernel. In addition, because the VM is of flexibility and good scalability, scalability and flexibility of the vSwitch and an entire virtual network are improved. Further, because the virtual switching function is implemented on the virtual machine, the virtual switch has a same priority as a common VM, so as to form a peer network virtualization architecture. During resource allocation, the virtual switch uses a physical resource in user space like the common VM, which facilitates the Host to perform management and efficiently and reasonably allocate a resource.

Figure 3:
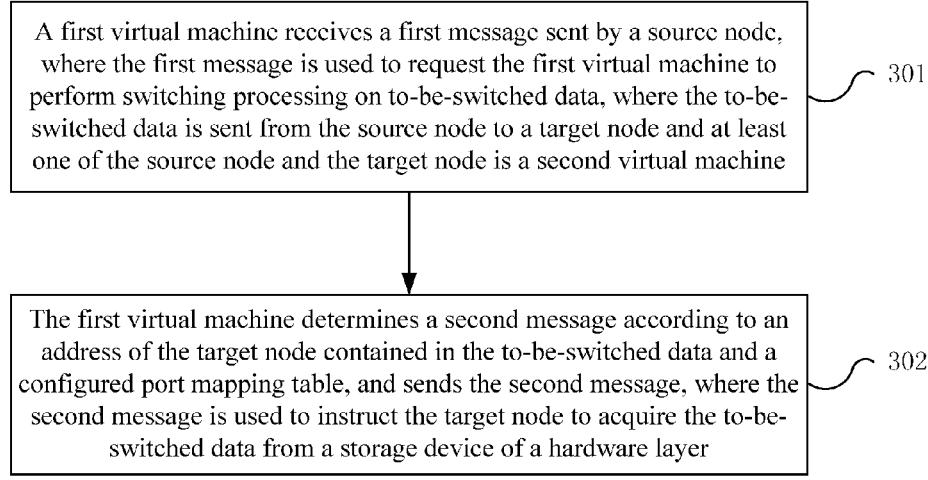
FIG. 3 is a flowchart of a virtual switching method according to an embodiment of the present invention.

FIG. 3 is a flowchart of a virtual switching method according to an embodiment of the present invention. The method in FIG. 3 is executed by a virtual machine having a virtual switching function (hereinafter referred to as a first virtual machine).

301: The first virtual machine receives a first message sent by a source node, where the first message is used to request the first virtual machine to perform switching processing on to-be-switched data, where the to-be-switched data is sent from the source node to a target node and at least one of the source node and the target node is a second virtual machine.

The first virtual machine is a virtual machine having a virtual switching function, has a same position with other common virtual machines, and runs on a Host. The source node may be a common VM on the Host. It should be understood that the common virtual machine herein is relative to the virtual machine having a virtual switching function. The source node may also be a virtual machine or a physical machine outside the Host. However, because the Host communicates with the outside through a Host NIC, communication with the virtual machine or the physical machine outside the Host is simply described as communication with the Host NIC. That is, the source node may also be a Host NIC. Likewise, the target node may be a common VM on the Host and may also be a Host NIC.

302: The first virtual machine determines a second message according to an address of the target node contained in the to-be-switched data and a configured port mapping table, and sends the second message, where the second message is used to instruct the target node to acquire the to-be-switched data from a storage device of a hardware layer.

It should be understood that, in the foregoing step 302, the configured port mapping table may be configured by the first virtual machine, including initialization configuration of the port mapping table at an initial stage of establishment of a virtual network and dynamic maintenance of the port mapping table during the virtual network running at a later stage. The first virtual machine may only execute a configuration command, while the configuration command may be configured by the Host or network maintenance personnel.

In the embodiment of the present invention, a virtual switching function is deployed on a virtual machine, which simplifies a VMM and facilitates a Host to manage a virtual network and efficiently and reasonably allocate a network resource.

Optionally, as an embodiment, before step 301, the method further includes receiving a configuration command sent by the Host; configuring, according to the configuration command, a first virtual port, which is used to communicate with the second virtual machine, of the first virtual machine and a second virtual port, which is used to communicate with an I/O device, of the first virtual machine; and establishing a mapping relationship between the first virtual port and the second virtual port, so as to generate the port mapping table.

Optionally, as another embodiment, the first virtual machine configures, according to the configuration command, first share memory corresponding to the second virtual machine, where the first share memory is a specified storage area on the storage device of the hardware layer.

Specifically, through an agent module in the first virtual machine, a configuration and management module in the Host may negotiate a communication mechanism (a communication manner) and a port mapping between the vSwitch and the Host NIC, as well as a communication mechanism (a communication manner) and a port mapping between the vSwitch and a VMM NIC. Optionally, the configuration and management module may further negotiate share memory between the vSwitch and the VMM NIC, and the like, where the share memory is a specified storage area on the storage device of the hardware layer. After that, an entry may be created according to a correspondence between various negotiated configurations to generate the port mapping table. For example, a correspondence among an address of a VM, a port number of a vSwitch corresponding to the VM, and an address of the share memory negotiated between the VM and the vSwitch is established to generate an entry of the port mapping table. During virtual switching, the first virtual machine receives the to-be-switched data from the first virtual port of the first virtual machine, where the first virtual port corresponds to the source node; and sends, through the second virtual port of the first virtual machine, the to-be-switched data to the target node, where the second virtual port is determined by the first virtual machine according to the first virtual port and the preconfigured port mapping table. The foregoing process of receiving the to-be-switched data from the first virtual port and sending, through the second virtual port, the to-be-switched data to the target node is a logical switching process of the first virtual machine. The first virtual port for the first virtual machine to communicate with the source node and the second virtual port for the first virtual machine to communicate with the target node are pre-negotiated and preconfigured.

Optionally, as another embodiment, when the source node is the second virtual machine and the target node is the I/O device, receiving, by the first virtual machine, a first message sent by a source node includes receiving, by the first virtual machine through the first virtual port, the first message sent by the second virtual machine, where the first message includes a writing completion interrupt which indicates, to the first virtual machine, that the second virtual machine has written to-be-switched data into the first share memory; determining, by the first virtual machine, an address of the corresponding first share memory according to the first virtual port which is used to receive the first message; acquiring the to-be-switched data from the first share memory and determining, according to an address of the I/O device contained in the to-be-switched data, the second virtual port that corresponds to the I/O device from the port mapping table; and determining the second message containing the address of the first share memory and a reading instruction, and sending the second message to the I/O device through the second virtual port, so that the I/O device reads the to-be-switched data from the first share memory.

Specifically, a virtual connection is established between the second virtual machine used as the source node in the Host and the first virtual port, where the first virtual port is a virtual port that is preconfigured by the first virtual machine and corresponds to the second virtual machine. The second virtual machine sends the to-be-switched data to the first virtual port. The to-be-switched data is actually written into share memory which is pre-negotiated between the second virtual machine and the first virtual machine. After the to-be-switched data is written into the share memory, the second virtual machine sends writing completion indication information to the first virtual machine. The first virtual machine queries the internally configured port mapping table to determine the second virtual port and a Host network interface card (Host NIC) corresponding to the second virtual port, and sends reading indication information to the Host NIC through the second virtual port to command the Host NIC to read the to-be-switched data from the share memory, so that the Host NIC further sends the to-be-switched data to the target node outside the Host. It should be understood that the target node may also be understood as a Host NIC in a process in which the second virtual machine sends the to-be-switched data to the outside of the Host.

Optionally, as another embodiment, when the source node is the I/O device and the target node is the second virtual machine, after the receiving, by the first virtual machine, a first message sent by a source node, the method further includes acquiring, by the first virtual machine from the I/O device, the address of the target node contained in the to-be-switched data, where the address of the target node is an address of the second virtual machine; and the determining, by the first virtual machine, a second message according to an address of the target node contained in the to-be-switched data and a configured port mapping table, and sending the second message includes determining, by the first virtual machine by querying the port mapping table according to the address of the second virtual machine, the first virtual port corresponding to the second virtual machine and determining an address of the first share memory corresponding to the second virtual machine; sending, through the second virtual port corresponding to the I/O device, a reply message containing the address of the first share memory to the I/O device, so that the I/O device writes the to-be-switched data into the first share memory according to the reply message; and, when the first virtual machine receives, from the I/O device, a writing completion interrupt which indicates, to the first virtual machine, that the I/O device has written the to-be-switched data into the first share memory, determining the second message containing a reading instruction and sending, through the first virtual port, the second message to the second virtual machine, so that the second virtual machine reads the to-be-switched data from the first share memory.

Specifically, the first virtual machine acquires, from the I/O device, the address of the target node contained in the to-be-switched data as follows. The first virtual machine learns, after receiving a notification of the first message, that the I/O device (namely, an underlying physical network interface card) receives the to-be-switched data. After that, the first virtual machine may directly access the to-beswitched data through a driver layer, so as to acquire the address of the target node contained in the to-be-switched data.

Optionally, as another embodiment, at least one VM further includes a third virtual machine; and when the source node is the second virtual machine and the target node is the third virtual machine, that is, when both the source node and the target node are common VMs on the Host, the receiving, by the first virtual machine, a first message sent by a source node includes receiving, by the first virtual machine through the first virtual port, the first message sent by the second virtual machine, where the first message includes a writing completion interrupt which indicates, to the first virtual machine, that the second virtual machine has written the to-be-switched data into second share memory that the second virtual machine pre-negotiates, through the first virtual machine, with the third virtual machine, where the second share memory is a specified storage area on the storage device of the hardware layer and; the determining, by the first virtual machine, a second message according to an address of the target node contained in the to-be-switched data and a configured port mapping table, and sending the second message includes determining, by the first virtual machine according to the first virtual port used to receive the first message, an address of the second virtual machine corresponding to the first virtual port; determining an address of the second share memory according to the address of the second virtual machine and an address of the third virtual machine contained in the to-be-switched data; and determining the second message containing the address of the second share memory and a reading instruction, and sending the second message to the third virtual machine, so that the third virtual machine reads the to-be-switched data from the second share memory.

The second share memory is negotiated by the second virtual machine and the third virtual machine through the first virtual machine, and may be specifically negotiated by using a Xen event channel.

Optionally, as another embodiment, the foregoing method further includes receiving reading completion indication information sent by the target node, so as to release the first share memory or the second share memory. Specifically, after reading the to-be-switched data, the target node sends the reading completion indication information to the first virtual machine. After receiving the reading completion indication information, the first virtual machine recovers a writable right of the share memory, that is, releases the share memory.

It should be understood that the foregoing first share memory and second share memory are only used for differentiation and constitute no limitation to the present invention. Both the first share memory and the second share memory are a part of memory space specified on the storage device of the hardware layer, and are random and uncertain. For example, after the first share memory is released, the first share memory may be allocated as the second share memory. In this case, the first share memory and the second share memory correspond to same memory space.

Optionally, as another embodiment, when the port mapping table is an Openflow flowtable, the first virtual machine determines, according to the address of the target node contained in the to-be-switched data, an entry matching the address of the target node in the Openflow flowtable, where the Openflow flowtable includes at least one entry and the entry includes an address, a virtual port, and an execution action parameter; if the matched entry exists, the first virtual machine processes the to-be-switched data according to the execution action parameter, which is in the matched entry, corresponding to the address of the target node; and if the matched entry does not exist, the first virtual machine creates a new entry that can match the to-be-switched data and inserts the new entry into the Openflow flowtable.

It can be seen from the foregoing descriptions that, in the embodiment of the present invention, a computing node includes a hardware layer, a Host running on the hardware layer, and at least one VM running on the Host, where the hardware layer includes an I/O device and a storage device, the at least one VM includes a first virtual machine having a virtual switching function, and the at least one VM further includes a second virtual machine. In this way, by implementing the virtual switching function on the virtual machine, the virtual switch has a same priority as a common VM, so as to form a peer network virtualization architecture. During resource allocation, the virtual switch uses a physical resource in user space like the common VM, which facilitates the Host to perform management and efficiently and reasonably allocate a resource. A virtual switching method applied to the computing node includes receiving, by the first virtual machine, a first message sent by a source node, where the first message is used to request the first virtual machine to perform switching processing on to-be-switched data, where the to-be-switched data is sent from the source node to a target node and at least one of the source node and the target node is the second virtual machine; and determining, by the first virtual machine, a second message according to an address of the target node contained in the to-be-switched data and a configured port mapping table, and sending the second message, where the second message is used to instruct the target node to acquire the to-be-switched data from the storage device of the hardware layer. According to the method, the virtual switching function is separated and decoupled from a Host kernel, and the virtual switching function is implemented on the virtual machine instead, which simplifies design of the Host kernel and reduces a burden of the Host kernel. In addition, because the VM is of flexibility and good scalability, scalability and flexibility of the vSwitch and an entire virtual network are improved, which facilitates separation of a control plane from a data plane, meets a need of an SDN, and supports Openflow.

Figure 4:
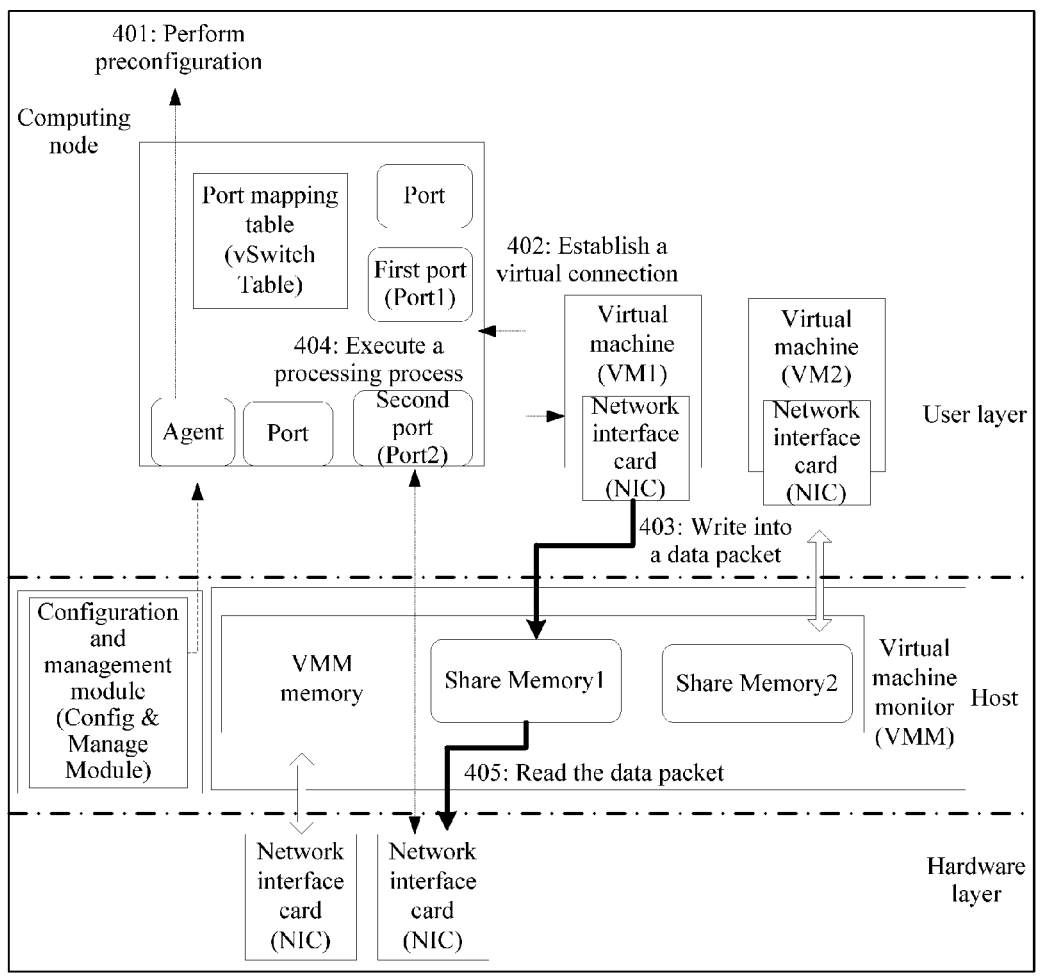
FIG. 4 is a schematic diagram of a virtual switching data flow according to an embodiment of the present invention.

FIG. 4 is a schematic diagram of a virtual switching data flow according to an embodiment of the present invention. As shown in FIG. 4, a virtual switch (vSwitch) (a virtual switching function) is deployed on a first virtual machine, so that the first virtual machine becomes a virtual switching device and is in an equal position with common virtual machines VM1 and VM2. An Agent module in the first virtual machine is connected to a configuration and management module (Config and Manage Module) in a Host to facilitate a system administrator to configure the first virtual machine. A virtual port of the first virtual machine may be connected to the VM1, the VM2, or an underlying physical network interface card Host NIC of a VMM. The following describes in detail, by using a data flow, a process of sending, by a common VM (for example, the VM1) in the Host, to-be-switched data to the outside (the Host NIC). It should be understood that a system architecture shown in FIG. 4 is merely used as an example and the number of modules such as a VM, a port, and a Host NIC may be extended.

401: Perform Preconfiguration.

Before virtual switching is performed, a virtual network needs to be constructed and preconfiguration is performed on the vSwitch (the first virtual machine). Specifically, a configuration command may be sent to the Agent module in the first virtual machine through the Config and Manage Module on the Host, so that the Agent module configures a port mapping of the vSwitch and VLAN management.

Specifically, a manner, share memory, and a port for communication between the common VM and the vSwitch, as well as a manner and a port for communication between the vSwitch and the Host NIC may be negotiated, and the port mapping of the vSwich is configured to generate a port mapping table. The communication manner may include memory sharing, IO cut-through, zero-copy, Direct Memory Access (DMA), or the like. Memory sharing is a mechanism of inter-process communication (IPC) in an operating system. Zero-copy is a technology that prevents a central processing unit (CPU) from copying data from one storage to another storage, and is implemented by using a manner such as I/O cut-through and MMAP. As a more exemplary embodiment, the common VM communicates with the vSwitch in a manner of memory sharing, and the vSwitch communicates with the Host NIC in a manner of IO cut-through or DMA, which can enable a switching device involved in the present invention to implement zero-copy, thereby decreasing a resource overhead and improving switching efficiency.

402: Establish a Virtual Connection.

When the VM1 needs to send data to the outside of the Host (the Host NIC), the VM1 first establishes a virtual connection with a first virtual port1 of the vSwitch. The port1 is a virtual port that is pre-configured by the Agent module in step 401 and corresponds to the VM1. A corresponding physical process is that the VM1 is mapped, through a virtual network interface card (virtual NIC) of the VM1, to share memory corresponding to the VM1.

403: Write the to-be-Switched Data.

After that, the VM1 sends, through the virtual NIC of the VM1, the to-be-switched data to the port1. A corresponding actual physical process is to write the to-be-switched data into the share memory corresponding to the VM1. After the to-be-switched data is written into the share memory, the VM1 sends writing completion indication information to the vSwitch through the port1 to instruct the vSwitch to perform a next operation. Specifically, the writing completion indication information may be a writing completion interrupt.

404: Execute a Switching Process.

After the vSwitch receives the writing completion indication information sent by the VM1, the switching process is followed. The internal port mapping table of the vSwitch, which is configured by the Agent module, is queried to determine an egress port (a second virtual port2) of the to-be-switched data and a corresponding Host NIC. Specifically, the port mapping table stores an input port, an output port, a source address, a target address and so on, where there are correspondences between the input port, the output port, the source address, and the target address. Therefore, the vSwitch may determine an output port according to information such as a target address and a port contained in the to-be-switched data, thereby completing the switching process. The input/output port information herein may be a port number of a virtual port of the vSwitch. The source address/target address may be an Internet Protocol (IP) address or a multimedia access control (MAC) address of a source node/target node.

405: Read the to-be-Switched Data.

After the port2 is determined, the vSwitch sends reading indication information to the Host NIC through the port2. The reading indication information may contain an address of the share memory into which the to-be-switched data is stored to command the Host NIC to read the to-be-switched data in the share memory. After the data is read, the Host NIC may send the to-be-switched data to an externally connected device or node of the Host, and send reading completion indication information to the vSwitch through the port2, so that the vSwitch recovers a writable right of the share memory, that is, releases the share memory. The reading completion indication information may be a reading completion interrupt.

It should be understood that, for ease of description, the to-be-switched data is used as an example in the embodiment of the present invention to describe a specific virtual switching process. In fact, actual virtual switching may further be a data flow, signaling, a message, and the like, which is not limited by the present invention.

It can be seen from the foregoing descriptions that, in the embodiment of the present invention, by implementing a virtual switching function on a virtual machine, the virtual switch have a same priority as a common VM, so as to form a peer network virtualization architecture. During resource allocation, the virtual switch uses a physical resource in user space like the common VM, which facilitates a Host to perform management and efficiently and reasonably allocate a resource. A virtual switching method applied to a computing node includes receiving, by a first virtual machine, a first message sent by a source node, where the first message is used to request the first virtual machine to perform switching processing on to-be-switched data, where the to-be-switched data is sent from the source node to a target node and at least one of the source node and the target node is a second virtual machine; and determining, by the first virtual machine, a second message according to an address of the target node contained in the to-be-switched data and a configured port mapping table, and sending the second message, where the second message is used to instruct the target node to acquire the to-be-switched data from a storage device of a hardware layer. According to the method, the virtual switching function is separated and decoupled from a Host kernel, and the virtual switching function is implemented on the virtual machine instead, which simplifies design of the Host kernel and reduces a burden of the Host kernel. In addition, because the VM is of flexibility and good scalability, scalability and flexibility of a vSwitch and an entire virtual network are improved.

Figure 5:
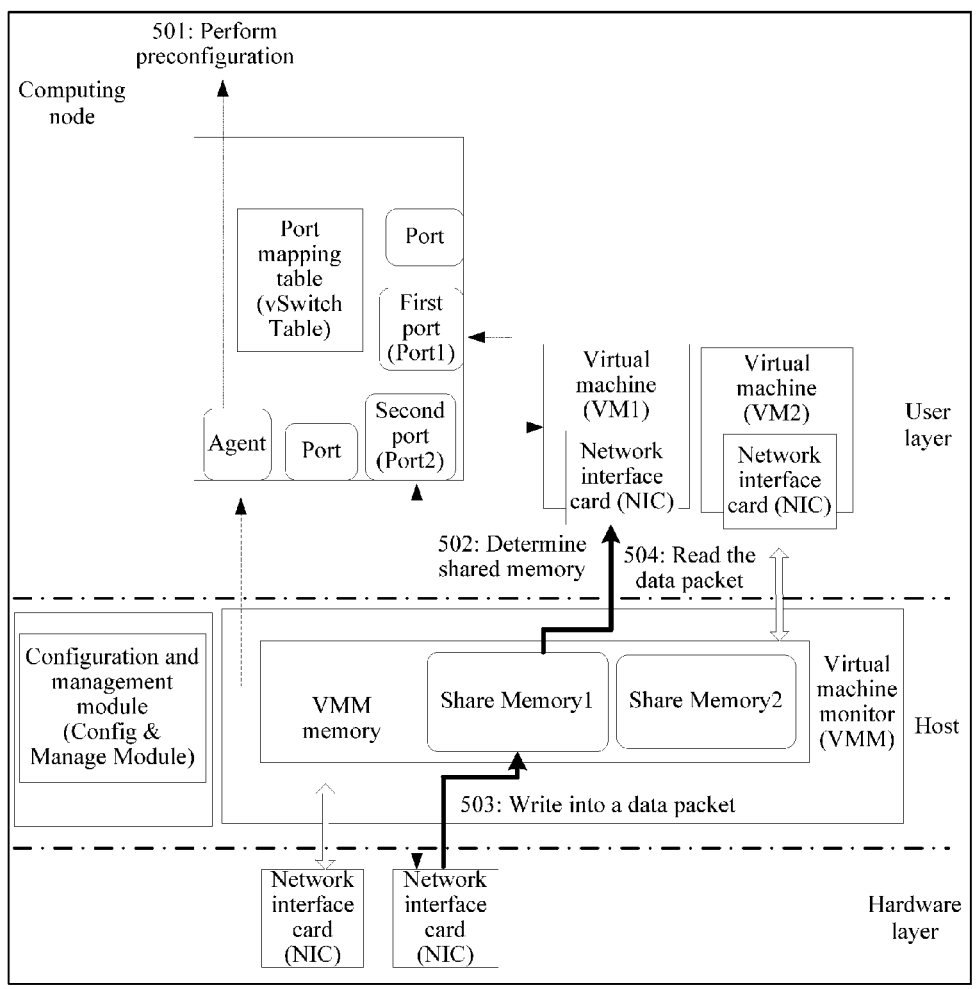
FIG. 5 is a schematic diagram of a virtual switching data flow according to another embodiment of the present invention.

FIG. 5 is a schematic diagram of a virtual switching data flow according to another embodiment of the present invention. As shown in FIG. 5, a virtual switch (vSwitch) (a virtual switching function) is deployed on a first virtual machine, so that the first virtual machine becomes a virtual switching device and is in an equal position with common virtual machines VM1 and VM2. An agent module in the first virtual machine is connected to a configuration and management module (Config and Manage Module) in a Host to facilitate a system administrator to configure the first virtual machine. A virtual port of the first virtual machine may be connected to the VM1, the VM2, or an underlying physical network interface card Host NIC of a VMM. The following describes in detail, by using a data flow, a process of sending, by the outside (the Host NIC) of the Host, to-be-switched data to a common VM (for example, the VM1) in the Host. It should be understood that a system architecture shown in FIG. 5 is merely used as an example and the number of modules such as a VM, a port, and a Host NIC may be extended.

501: Perform Preconfiguration.

Before virtual switching is performed, a virtual network needs to be constructed and preconfiguration is performed on the vSwitch (the first virtual machine). Specifically, a configuration command may be sent to the Agent module in the first virtual machine through the Config and Manage Module on the Host, so that the Agent module configures a port mapping of the vSwitch and VLAN management. A specific configuration process and configuration items are similar to those in the foregoing step 301 in FIG. 3 and are not described herein again.

502: Determine Share Memory.

After receiving the to-be-switched data that is transmitted from the outside (a source node), the Host NIC queries an address of a target node (the VM1) and sends request information containing the address of the VM1 to the vSwitch through a port1, where the port1 is a virtual port that is pre-configured by the Agent module in step 501 and corresponds to the Host NIC. After that, a driver layer of the vSwitch directly accesses the to-be-switched data and queries the internal port mapping table of the vSwitch, which is pre-configured by the Agent module, to determine an egress port (a second virtual port2) of the to-be-switched data and corresponding share memory. After that, a reply message containing an address of the share memory is sent to the Host NIC through the port1.

503: Write the to-be-Switched Data.

After receiving the address of the share memory, the Host NIC writes the to-be-switched data into the share memory. A writing manner is pre-configured by the Agent module in step 501, for example, the to-be-switched data is written into the share memory in a manner of DMA. After the to-be-switched data is written into the share memory, the Host NIC sends writing completion indication information to the vSwitch through the port1 to instruct the vSwitch to perform a next operation. The writing completion indication information may be a writing completion interrupt.

504: Read the to-be-Switched Data.

After receiving the writing completion indication information, the vSwitch sends reading indication information to the VM1 through the port2 to notify the VM1 of arrival of new data. After the to-be-switched data from the share memory is read, the VM1 sends reading completion indication information to the vSwitch through the port2, so that the vSwitch recovers a writable right of the share memory, that is, releases the share memory.

It should be understood that, for ease of description, the to-be-switched data is used as an example in the embodiment of the present invention to describe a specific virtual switching process. In fact, actual virtual switching may further be a data flow, signaling, a message, and the like, which is not limited by the present invention.

It can be seen from the foregoing descriptions that, in the embodiment of the present invention, by implementing a virtual switching function on a virtual machine, the virtual switch have a same priority as a common VM, so as to form a peer network virtualization architecture. During resource allocation, the virtual switch uses a physical resource in user space like the common VM, which facilitates a Host to perform management and efficiently and reasonably allocate a resource. A virtual switching method applied to a computing node includes receiving, by a first virtual machine, a first message sent by a source node, where the first message is used to request the first virtual machine to perform switching processing on to-be-switched data, where the to-be-switched data is sent from the source node to a target node and at least one of the source node and the target node is a second virtual machine; and determining, by the first virtual machine, a second message according to an address of the target node contained in the to-be-switched data and a configured port mapping table, and sending the second message, where the second message is used to instruct the target node to acquire the to-be-switched data from a storage device of a hardware layer. According to the method, the virtual switching function is separated and decoupled from a Host kernel, and the virtual switching function is implemented on the virtual machine instead, which simplifies design of the Host kernel and reduces a burden of the Host kernel. In addition, because the VM is of flexibility and good scalability, scalability and flexibility of a vSwitch and an entire virtual network are improved.

Figure 6:
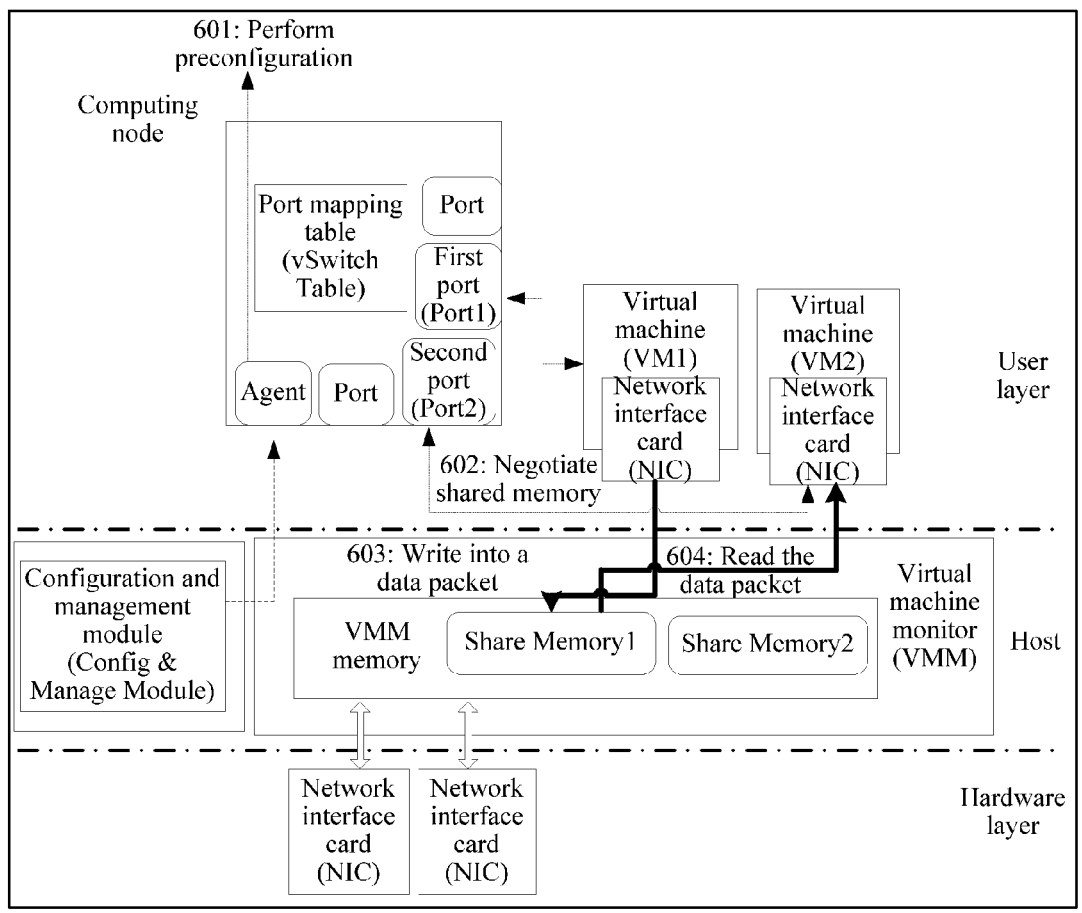
FIG. 6 is a schematic diagram of a virtual switching data flow according to another embodiment of the present invention.

FIG. 6 is a schematic diagram of a virtual switching data flow according to another embodiment of the present invention. As shown in FIG. 6, a virtual switch (vSwitch) (a virtual switching function) is deployed on a first virtual machine, so that the first virtual machine becomes a virtual switching device and is in an equal position with common virtual machines VM1 and VM2. An agent module in the first virtual machine is connected to a configuration and management module (Config and Manage Module) in a Host to facilitate a system administrator to configure the first virtual machine. A virtual port of the first virtual machine may be connected to the VM1, the VM2, or an underlying physical network interface card Host NIC of a VMM. The following describes in detail, by using a data flow, a process of sending to-be-switched data between common VMs (the VM1 and the VM2) in the Host. It should be understood that a system architecture shown in FIG. 6 is merely used as an example and the number of modules such as a VM, a port, and a Host NIC may be extended.

601: Perform Preconfiguration.

Before virtual switching is performed, a virtual network needs to be constructed and preconfiguration is performed on the vSwitch (the first virtual machine). Specifically, a configuration command may be sent to the Agent module in the first virtual machine through the Config and Manage Module on the Host, so that the Agent module configures a port mapping of the vSwitch and VLAN management. A specific configuration process and configuration items are similar to those in the foregoing step 301 in FIG. 3 and are not described herein again.

602: Negotiate Share Memory.

The share memory needs to be negotiated through the vSwitch for communication between the common VMs in the Host. Specifically, the VM1 may perform negotiation with the VM2 through the vSwitch. The vSwitch creates share memory for the VM1 and the VM2 to share. A specific negotiation process may be performed by using a Xen event channel. The VM1 establishes a virtual connection with a first virtual port1 of the vSwitch. The port1 is a virtual port that is pre-configured by the Agent module in step 601 and corresponds to the VM1. A corresponding physical process is that the VM1 is mapped, through a virtual network interface card (virtual NIC) of the VM1, to the share memory negotiated between the VM1 and the VM2.

603: Write the to-be-Switched Data.

After that, the VM1 sends, through the virtual NIC of the VM1, the to-be-switched data to the port1. A corresponding actual physical process is to write the to-be-switched data into the share memory that corresponds to the VM1. After the to-be-switched data is written into the share memory, the VM1 sends writing completion indication information to the vSwitch through the port1 to instruct the vSwitch to perform a next operation.

604: Read the to-be-Switched Data.

The vSwitch sends reading indication information to the VM2 to command the VM2 to read the to-be-switched data in the share memory. After the data is read by the VM2 from the share memory, the VM2 sends the to-be-switched data to an external target node of the Host, and sends reading completion indication information to the vSwitch, so that the vSwitch recovers a writable right of the share memory, that is, releases the share memory.

It should be understood that, for ease of description, the to-be-switched data is used as an example in the embodiment of the present invention to describe a specific virtual switching process. In fact, actual virtual switching may further be a data flow, signaling, a message, and the like, which is not limited by the present invention.

It can be seen from the foregoing descriptions that, in the embodiment of the present invention, by implementing a virtual switching function on a virtual machine, the virtual switch have a same priority as a common VM, so as to form a peer network virtualization architecture. During resource allocation, the virtual switch uses a physical resource in user space like the common VM, which facilitates a Host to perform management and efficiently and reasonably allocate a resource. A virtual switching method applied to a computing node includes receiving, by a first virtual machine, a first message sent by a source node, where the first message is used to request the first virtual machine to perform switching processing on to-be-switched data, where the to-be-switched data is sent from the source node to a target node and at least one of the source node and the target node is a second virtual machine; and determining, by the first virtual machine, a second message according to an address of the target node contained in the to-be-switched data and a configured port mapping table, and sending the second message, where the second message is used to instruct the target node to acquire the to-be-switched data from a storage device of a hardware layer. According to the method, the virtual switching function is separated and decoupled from a Host kernel, and the virtual switching function is implemented on a virtual machine instead, which simplifies design of the Host kernel and reduces a burden of the Host kernel. In addition, because the VM is of flexibility and good scalability, scalability and flexibility of a vSwitch and an entire virtual network are improved.

Figure 7:
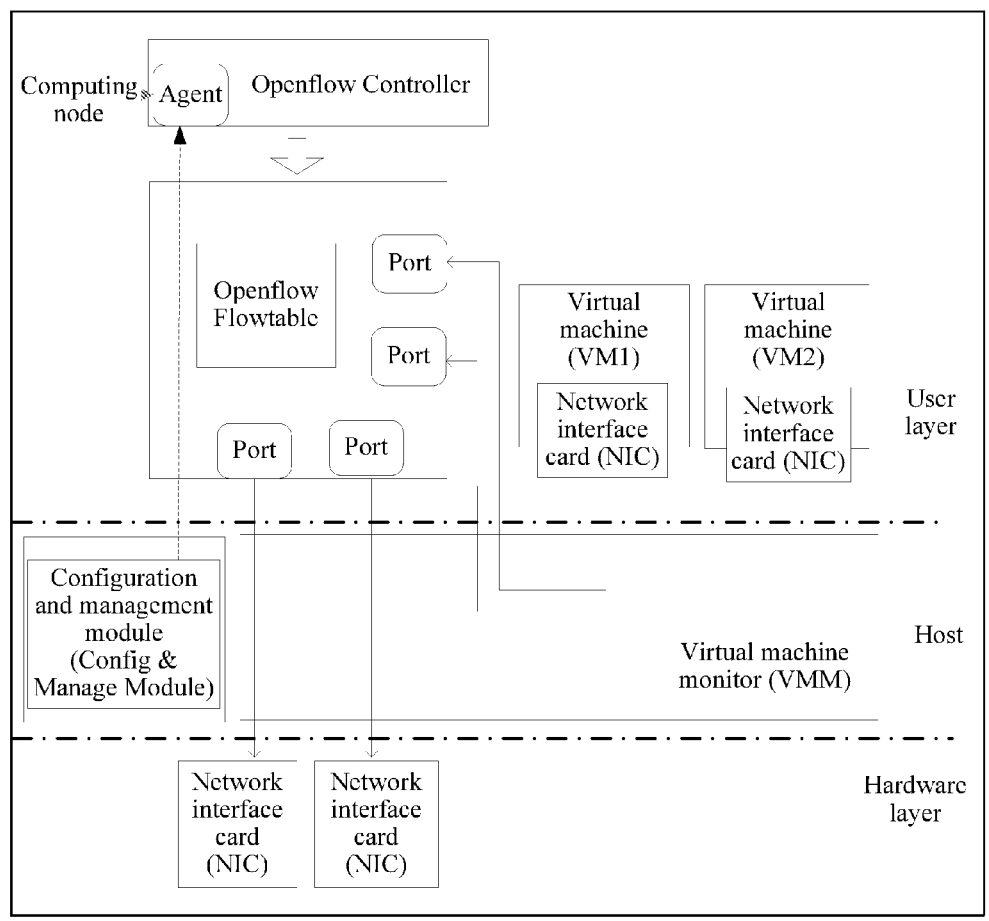
FIG. 7 is a schematic diagram of a virtual switching device applied to a software-defined network SDN according to another embodiment of the present invention.

FIG. 7 is a schematic diagram of a virtual switching device applied to a software-defined network (SDN) according to another embodiment of the present invention.

By decoupling a vSwitch from a Host kernel and deploying the vSwitch on a first virtual machine, the present invention simplifies design of the Host kernel and reduces a complexity degree of the Host kernel. In addition, because of high configurability, scalability, and flexibility of a virtual machine, scalability and flexibility of a vSwitch and even an entire virtualized network are improved. Therefore, the virtual switching device according to the embodiment of the present invention can implement separation of a control plane from a data plane, that is, meet a need of an SDN.

The SDN is a new-generation network architecture. The SDN performs protocol convergence at operation and control layers and separates the control plane from the data plane, which is different from a traditional network architecture in which protocol layering is implemented and the control plane and the data plane are converged. A typical SDN scheme is Openflow. Specifically, Openflow is implemented on a first virtual machine having a virtual switching function in the embodiment of the present invention. Logic implementation of the virtual switching device may be divided into two parts: an Openflow controller and an Openflow flowtable. The Openflow controller is responsible for the control plane and configured to configure a network topology, adjust a data forwarding policy, and configure and maintain the Openflow flowtable. The Openflow flowtable is responsible for the data plane and is a query mapping table for data flow forwarding. To meet a need of the SDN architecture for a switching device, the present invention may use the following two deployment manners:

Manner 1: The Openflow controller and the Openflow flowtable are implemented on a same VM, that is, the first virtual machine having the virtual switching function in the present invention. The Openflow controller may be implemented in user space, while the Openflow flowtable may be implemented in the user space or in kernel space.

Manner 2: The Openflow controller and the Openflow flowtable are implemented on two virtual machines having the virtual switching function separately. For example, the Openflow controller may be deployed on the first virtual machine. At least one VM running on a Host further includes a fourth virtual machine having the virtual switching function. The fourth virtual machine is similar to the first virtual machine and both exchange information by using an inter-VM communication technology, for example, a Xen event channel.

Specifically, as shown in FIG. 7, the Openflow controller and the Openflow flowtable of the virtual switch (vSwitch) are deployed on the first virtual machine or are deployed on two different virtual machines, so that the vSwitch is in an equal position with common virtual machines VM1 and VM2. An agent module in the controller is connected to a configuration and management module (Config and Manage Module) in the Host to facilitate a system administrator to configure the vSwitch. A virtual port of the Openflow flowtable part may be connected to the VM1, the VM2, or an underlying physical network interface card Host NIC of a VMM. It should be understood that a system architecture shown in FIG. 7 is merely used as an example and the number of modules such as a VM, a port, a Host NIC may be extended.

The Openflow controller and the Openflow flowtable cooperate mutually to implement forwarding of a service flow. The controller includes a user configuration database and a rule library. The Openflow flowtable is a table structure in the unit of a service flow and includes matching and execution parts. Each entry in the Openflow flowtable indicates a service flow. The matching part includes fields such as IP, MAC, and Port of to-be-switched data. The execution part indicates processing on matched to-be-switched data, including forwarding, discarding a packet, and applying for a new entry from the controller. For example, whenever to-be-switched data reaches the vSwitch, the vSwitch checks the fields such as IP, MAC, and Port of the to-be-switched data and searches the Openflow flowtable for a matched entry. If the matched entry is found, an operation is performed according to a field Action. If the matched entry is not found, the Openflow flowtable sends an entry creation request to the controller. After receiving the request, the controller queries the rule library, creates a new entry, and sends the new entry to the Openflow flowtable. The Openflow flowtable inserts the new entry and forwards, according to a rule, subsequent to-be-switched data that meets the entry.

It can be seen from the foregoing descriptions that, in the embodiment of the present invention, by implementing a virtual switching function on a virtual machine, the virtual switch have a same priority as a common VM, so as to form a peer network virtualization architecture. During resource allocation, the virtual switch uses a physical resource in user space like the common VM, which facilitates a Host to perform management and efficiently and reasonably allocate a resource. According to the method, the virtual switching function is separated and decoupled from a Host kernel, which decreases a degree of coupling between the Host and a vSwitch and allows deployment of a plurality of vSwitches on a same Host without being restricted by the Host. In addition, because the VM is of flexibility and good scalability, scalability and flexibility of the vSwitch and an entire virtual network are improved. The present invention further separates a configuring module and a to-be-switched data switching and forwarding module, which more conforms to programmable network design, thereby implementing an SDN on a virtualized network architecture in the embodiment of the present invention.

Figure 8:
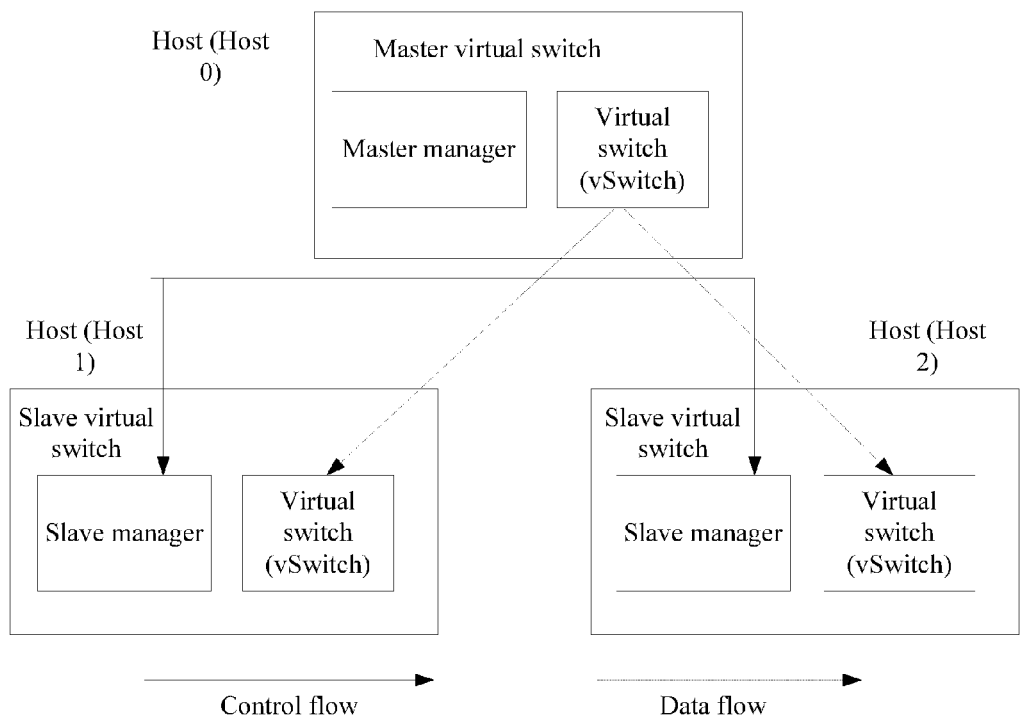
FIG. 8 is a schematic diagram of distributed implementation according to another embodiment of the present invention.

FIG. 8 is a schematic diagram of distributed implementation according to another embodiment of the present invention.

As shown in FIG. 8, a configuration architecture in the embodiment of the present invention includes one master virtual switch (vSwitch) and two slave virtual switches (vSwitches). It should be understood that, for ease of description, FIG. 8 only shows two slave vSwitches. This does not cause a limitation to the present invention. In fact, several slave vSwitches may be available. Each Host in FIG. 8 is the same as the Host running on the hardware layer in the foregoing embodiment. In addition, these Hosts may be Hosts running on a hardware layer of a same physical machine, or may be Hosts running on hardware layers of different physical machines, which is not limited by the present invention. Each vSwitch is a virtual machine having a virtual switching function, which is involved in the present invention. That is, each vSwitch is similar to the first virtual machine having the virtual switching function in the foregoing embodiment. A Master Manager and a Slave Manager in each Host may correspond to the configuration and management module (Config and Manage Module) in the Host in the foregoing embodiment. Accordingly, a control and management module of the Master vSwitch is set as the master manager and a control and management module of the Slave vSwitch is set as a Save Manager. Manners of managing, by the Master Manager and the Slave Manager, vSwitches of Hosts of the Master Manager and the Slave Manager are the same as the manners in the foregoing embodiments. The vSwitch may be configured and managed by an agent module in the vSwitch (the agent module is not shown in FIG. 8). The Master Manager is a user-configured interface and may be configured directly by a user by using a client program. The Master Manager communicates with the Slave Manager by using a protocol to negotiate a port mapping between various vSwitches. Communication between the Master Manager and the Slave Manager is a control flow, and communication between the Master vSwitch and the Slave vSwitch is a data flow.

Specifically, a configuration process of a distributed vSwitch according to the embodiment of the present invention is: A Master vSwitch is firstly created on one Host and then a vSwitch cascading configuration is created, including various Slave vSwitches as well as an IP address and a port mapping on each vSwitch. After that, the foregoing configuration information is sent to another Host by using a configuration protocol. Up to now, the Host bearing the Master vSwitch is a master Host and another Host receiving the configuration information is a Slave Host. After that, each Slave Host that has received the configuration information creates a control and management module, that is, a Slave Manager. Finally, each Slave Manager configures, according to the received configuration information, an IP address and a port on the corresponding Slave vSwitch. It should be understood that the configuration protocol involved in the embodiment of the present invention includes but is not limited to an application protocol such as Extensible Markup Language XML and HyperText Transfer Protocol HTTP.

Figure 9:
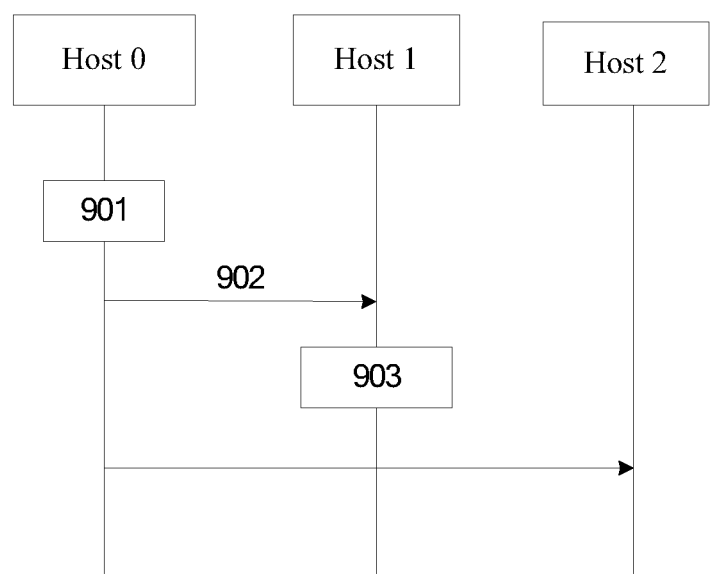
FIG. 9 is a flowchart of distributed implementation according to another embodiment of the present invention.

As a specific example, a configuration process of a distributed switching architecture according to an embodiment of the present invention is shown in FIG. 9.

901: A user logs in to a management module in a Host®, creates a vSwitch instance, and defines the vSwitch instance as Master.

902: Transmit a configuration message to management modules of a Host1 and a Host2 by using a communication protocol.

903: The management modules of the Host1 and the Host2 receive the configuration message, create a vSwitch instance according to a configuration requirement and define the vSwitch instance as Slave, point Master pointers of the vSwitch instances of the Host1 and Host2 to the vSwitch of the Host0, and then configure port mappings of vSwitches of the Host1 and Host2 according to a port mapping in the configuration message.

In the embodiment of the present invention, a virtual switching function is separated and decoupled from a Host kernel, which decreases a degree of coupling between a Host and a vSwitch and allows deployment of a plurality of vSwitches on a same Host without being restricted by the Host. In addition, the vSwitch is implemented in a guest operating system (OS) and does not need to depend on a kernel operating system Host OS/VMM OS any longer. Therefore, the vSwitch can be easily deployed and has good transplantability, thereby improving scalability and flexibility of the vSwitch and an entire virtual network. The distributed switching architecture according to the embodiment of the present invention cascades a plurality of vSwitches, thereby substantially extending the virtual network and substantially improving a virtual switching capability.

Figure 10:
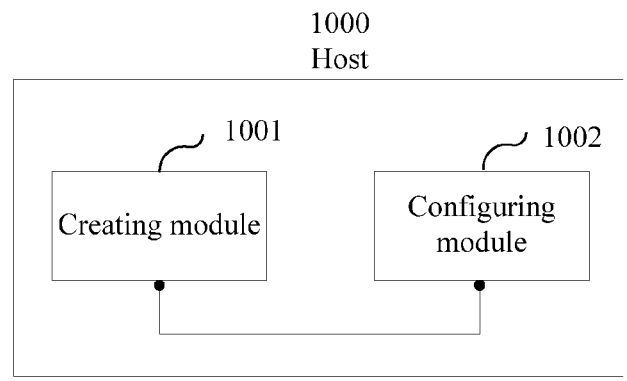
FIG. 10 is a schematic diagram of a module architecture of a host according to an embodiment of the present invention.

FIG. 10 is a schematic diagram of a module architecture of a Host according to an embodiment of the present invention. A Host 1000 in FIG. 10 includes a creating module 1001 and a configuring module 1002.

The creating module 1001 is configured to after an I/O virtual function of an I/O device is enabled, generate at least one VM on the Host, where the at least one VM includes a first virtual machine having a virtual switching function and the at least one VM further includes a second virtual machine.

The configuring module 1002 is configured to send a configuration command to the first virtual machine, so that the first virtual machine configures, according to the configuration command, a first virtual port, which is used to communicate with the second virtual machine, of the first virtual machine and a second virtual port, which is used to communicate with the I/O device, of the first virtual machine.

It may be understood that the Host 1000 in this embodiment may be the Host in the foregoing method embodiment and a function of each functional module of the Host 1000 may be specifically implemented according to the method in the foregoing method embodiment. For a specific implementation process of the function of each functional module of the Host 1000, reference may be made to related descriptions of the foregoing method embodiment, and details are not described herein again.

It can be seen from the foregoing descriptions that, in this embodiment, after the I/O virtual function of the I/O device is enabled, the Host 1000 generates, through the creating module 1001, the at least one virtual machine running on the Host 1000. Specifically, the creating module 1001 may be a configuration and management module (Config and Manage Module). The creating module 1001 may further create a virtual network interface card (virtual NIC) of a virtual machine by using a tool such as Qemu. The at least one virtual machine generated by the creating module 1001 includes at least one first virtual machine (vSwitch) having the virtual switching function and several common virtual machines VMs.

After that, the configuring module 1002, that is, the Config and Manage Module, sends the configuration command to an Agent module. The configuring module 1002 is connected to the agent module by using an inter-process communication technology (IPC) (such as IOCTL, NETLINK, and SOCKET). The configuring module 1002 transmits a configuration of a virtual environment of the Host 1000 to the Agent of the first virtual machine to enable the first virtual machine to acquire virtual environment information, thereby establishing a corresponding virtual network environment, where the configuration may specifically include configuration information such as an underlying physical network interface card of the Host 1000, a front-end (FE)/back-end (BE) of a VM, share memory, and a DMA interrupt.

It can be seen from the foregoing descriptions that, by using the virtual network environment built by the Host 1000, a virtual switching function is separated and decoupled from a kernel of the Host 1000 and is implemented on a first virtual machine instead, which simplifies design of a Host kernel and reduces a burden of the Host kernel. In addition, because a VM is of flexibility and good scalability, scalability and flexibility of a vSwitch and an entire virtual network are improved. Further, because the virtual switching function is implemented on the virtual machine, the virtual switch is in an equal position with and has a same priority as a common VM, so as to form a peer network virtualization architecture. During resource allocation, the virtual switch uses a physical resource in user space like the common VM, which facilitates the Host 1000 to perform management and efficiently and reasonably allocate a resource.

Figure 11:
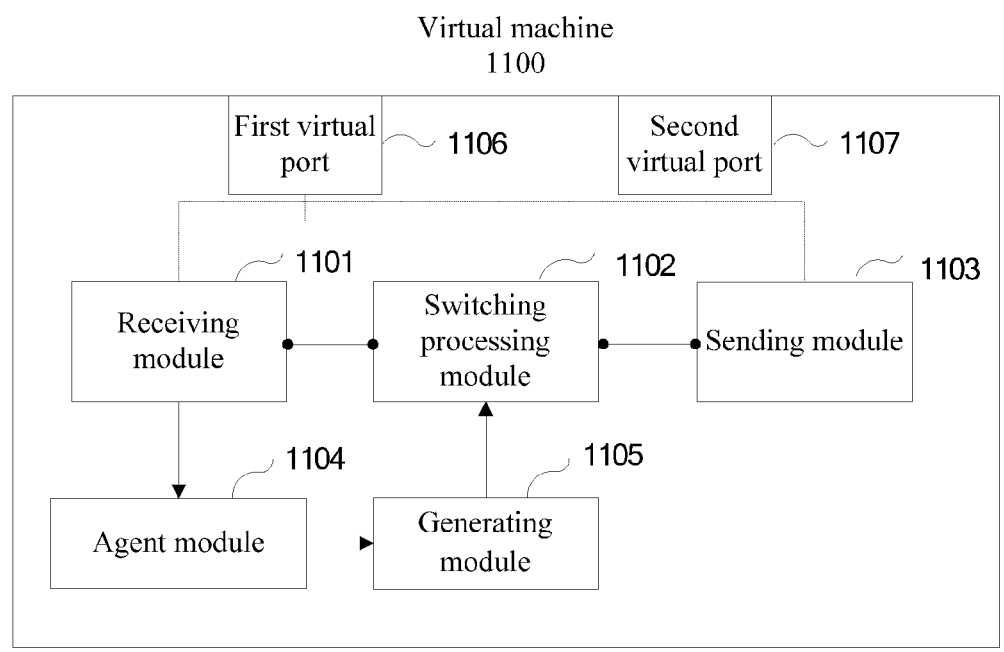
FIG. 11 is a schematic diagram of a module architecture of a virtual machine according to an embodiment of the present invention.

FIG. 11 is a schematic diagram of a module architecture of a virtual machine according to an embodiment of the present invention. A virtual machine 1100 in FIG. 11 includes a receiving module 1101, a switching processing module 1102, and a sending module 1103.

The receiving module 1101 is configured to receive a first message sent by a source node, where the first message is used to request the virtual machine 1100 to perform switching processing on to-be-switched data, where the to-be-switched data is sent from the source node to a target node and at least one of the source node and the target node is a second virtual machine, where the second virtual machine runs on a Host.

The switching processing module 1102 is configured to determine a second message according to an address of the target node contained in the to-be-switched data and a port mapping table configured by the virtual machine 1100, where the second message is used to instruct the target node to acquire the to-be-switched data from a storage device of a hardware layer.

The sending module 1103 is configured to send the second message to the target node.

The virtual machine 1100 according to the embodiment of the present invention is a virtual machine having a virtual switching function, and is in an equal position with other common virtual machines and is deployed on the Host. The source node may be a common virtual machine on the Host, or may be a virtual machine or a physical machine outside the Host. Likewise, the target node may be a common virtual machine on the Host, or may be a virtual machine or a physical machine outside the Host.

It may be understood that the virtual machine 1100 according to the embodiment of the present invention may be the first virtual machine having the virtual switching function in the foregoing method embodiment and a function of each functional module of the virtual machine 1100 may be specifically implemented according to the method in the foregoing method embodiment. For a specific implementation process of the function of each functional module of the virtual machine 1100, reference may be made to related descriptions of the foregoing method embodiment, and details are not described herein again.

In the embodiment of the present invention, a virtual switching function is deployed on a virtual machine, which simplifies a VMM and facilitates a Host to manage a virtual network and efficiently and reasonably allocate a network resource.

Optionally, as an embodiment, the virtual machine 1100 further includes an agent module 1104 and a generating module 1105. Specifically, the agent module 1104 is configured to configure, according to a configuration command sent by the Host, a first virtual port 1106, which is used to communicate with the second virtual machine, of the virtual machine 1100 and a second virtual port 1107, which is used to communicate with an I/O device, of the virtual machine. The generating module 1105 is configured to establish a mapping relationship between the first virtual port 1106 and the second virtual port 1107, so as to generate the port mapping table.

Optionally, as an embodiment, the Agent module 1104 is further configured to configure, according to the configuration command, first share memory corresponding to the second virtual machine, where the first share memory is a specified storage area on the storage device of the hardware layer. Specifically, the first share memory may be negotiated through an event channel between the second virtual machine and the virtual machine 1100. The receiving module 1101 is specifically configured to receive the first message through the first virtual port 1106, where the first message includes a writing completion interrupt which indicates, to the virtual machine 1100, that the source node has written the to-be-switched data into the first share memory. The switching processing module 1102 is specifically configured to determine an address of the corresponding first share memory according to the first virtual port 1106 used to receive the first message; acquire, from the first share memory, the address of the target node contained in the to-be-switched data, so as to determine the second virtual port 1107 corresponding to the target node; and determine the second message containing the address of the first share memory and a reading instruction. The sending module 1103 is specifically configured to send the second message to the target node through the second virtual port 1107 corresponding to the first virtual port 1106 in the port mapping table. The source node is the second virtual machine and the target node is the I/O device.

Optionally, as an embodiment, the receiving module 1101 is specifically configured to receive the first message sent by the source node. The switching processing module 1102 is specifically configured to acquire the address of the target node contained in the to-be-switched data; and determine, by querying the port mapping table according to the address of the target node, the first virtual port 1106 corresponding to the target node and determine an address of the first share memory corresponding to the second virtual machine. The sending module 1103 is specifically configured to send a reply message containing the address of the first share memory to the target node through the second virtual port 1107 corresponding to the I/O device. The switching processing module 1102 is further configured to, when a writing completion interrupt, which indicates to the virtual machine 1100 that the source node has written the to-be-switched data into the first share memory and which is sent by the source node, is received, determine the second message containing a reading instruction. The sending module 1103 is further configured to send the second message to the target node through the first virtual port 1106. The receiving module 1101 is further configured to receive the writing completion interrupt indicating that the source node has written the to-be-switched data into the first share memory and sent by the source node. The source node is the I/O device and the target node is the second virtual machine.

Optionally, as an implementation manner, the receiving module 1101 is specifically configured to receive, through the first virtual port 1106, the first message sent by the source node, where the first message includes a writing completion interrupt. The switching processing module 1102 is specifically configured to determine, according to the first virtual port 1106 used to receive the first message, an address of the corresponding source node; determine an address of second share memory according to the address of the source node and the address of the target node contained in the to-be-switched data; and determine the second message containing the address of the second share memory and a reading instruction. The sending module 1103 is specifically configured to send the second message to the target node.

Optionally, as another embodiment, the receiving module 1101 is further configured to receive reading completion indication information sent by the target node, so that the virtual machine 1100 releases the first share memory or the second share memory.

Specifically, the first virtual machine acquires, from the I/O device, the address of the target node contained in the to-be-switched data as follows. The first virtual machine learns, after a notification of the first message is received, that the I/O device (namely, an underlying physical network interface card) receives the to-be-switched data. After that, the first virtual machine may directly access the to-be-switched data through a driver layer, so as to acquire the address of the target node contained in the to-be-switched data.

Optionally, in an implementation manner, when the port mapping table is an Openflow flowtable, the virtual machine 1100 further includes an Openflow controller including the Agent module 1104. After the receiving module 1101 receives the first message sent by the source node, the switching processing module 1102 is further configured to determine, according to the address of the target node contained in the to-be-switched data, an entry matching the address of the target node in the Openflow flowtable, where the Openflow flowtable includes at least one entry and the entry includes an address, a virtual port, and an execution action parameter; if the matched entry exists, process the to-be-switched data according to the execution action parameter, which is in the matched entry, corresponding to the address of the target node; and if the matched entry does not exist, send an entry creation request to the Openflow controller, so that the Openflow controller creates, according to the entry creation request, a new entry that can match the to-be-switched data and inserts the new entry into the Openflow flowtable.

In the embodiment of the present invention, by deploying a virtual switching function on the virtual machine 1100, the virtual machine 1100 having the virtual switching function is in an equal position with other common virtual machines, which is favorable for a Host to manage a virtual network and efficiently and reasonably allocate a network resource. In addition, the virtual switching function is separated from a Host kernel, thereby enhancing scalability, enabling the virtual machine 1100 to meet a need of an SDN, and supporting Openflow.

Figure 12:
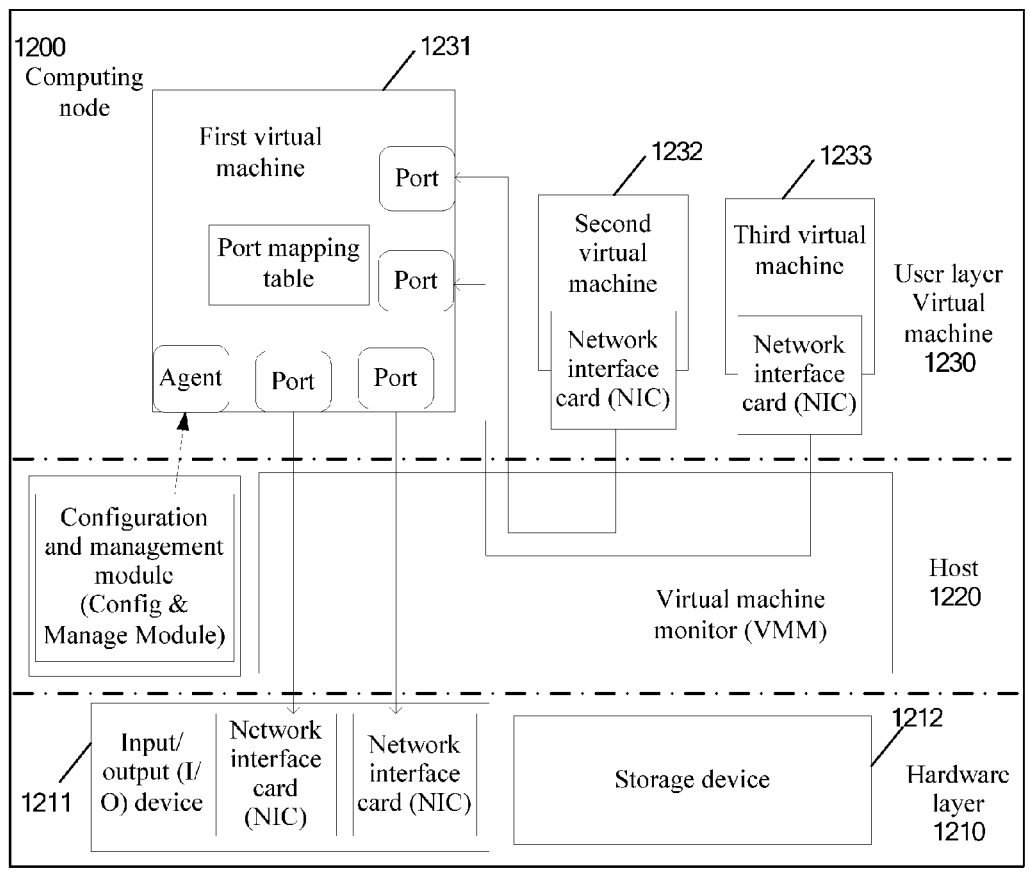
FIG. 12 is a schematic diagram of a computing node according to an embodiment of the present invention.

FIG. 12 is a schematic diagram of a computing node according to an embodiment of the present invention. The computing node 1200 shown in FIG. 12 may include a hardware layer 1210, a Host 1220 running on the hardware layer 1210, and at least one virtual machine 1230 running on the Host 1220.

The hardware layer 1210 includes an I/O device 1211 and a storage device 1212. The at least one virtual machine 1230 includes a first virtual machine 1231 having a virtual switching function, and the at least one virtual machine 1230 further includes a second virtual machine 1232.

The first virtual machine 1231 is configured to receive a first message sent by a source node, where the first message is used to request the first virtual machine 1231 to perform switching processing on to-be-switched data, where the to-be-switched data is sent from the source node to a target node and at least one of the source node and the target node is the second virtual machine 1232.

The first virtual machine 1231 is further configured to determine a second message according to an address of the target node contained in the to-be-switched data and a configured port mapping table, and send the second message, where the second message is used to instruct the target node to acquire the to-be-switched data from the storage device 1212 of the hardware layer 1210.

In addition, the Host 1220 is configured to send a configuration command to the first virtual machine 1231.

The first virtual machine 1231 is further configured to configure, through an agent module of the first virtual machine 1231, a first virtual port, which is used to communicate with the second virtual machine 1232, of the first virtual machine 1231 and a second virtual port, which is used to communicate with the I/O device 1211, of the first virtual machine 1231 according to the configuration command.

The first virtual machine 1231 is further configured to establish a mapping relationship between the first virtual port and the second virtual port, so as to generate the port mapping table.

Optionally, the first virtual machine 1231 is further configured to configure, according to the configuration command, first share memory corresponding to the second virtual machine 1232, where the first share memory is a specified storage area on the storage device 1212 of the hardware layer 1210.

Specifically, as an example of exchange between a data flow and a signaling flow, when the source node is the second virtual machine 1232 and the target node is the I/O device 1211, the second virtual machine 1232 is configured to write the to-be-switched data into the first share memory; the second virtual machine 1232 is further configured to send the first message to the first virtual machine 1231; the first virtual machine 1231 is specifically configured to receive the first message through the first virtual port, where the first message includes a writing completion interrupt which indicates, to the first virtual machine 1231, that the second virtual machine 1232 has written the to-be-switched data into the first share memory; determine an address of the corresponding first share memory according to the first virtual port used to receive the first message; acquire, from the first share memory, the address of the I/O device 1211 contained in the to-be-switched data to determine the second virtual port corresponding to the I/O device 1211; determine the second message containing the address of the first share memory and a reading instruction, and send the second message to the I/O device 1211 through the second virtual port corresponding to the first virtual port in the port mapping table; and the I/O device 1211 is configured to read the to-be-switched data from the first share memory according to the second message.

Specifically, as an example of exchange between a data flow and a signaling flow, when the source node is the I/O device 1211 and the target node is the second virtual machine 1232, the first virtual machine 1231 is specifically configured to receive the first message sent by the I/O device 1211 and acquire the address of the second virtual machine 1232 contained in the to-be-switched data; determine, by querying the port mapping table according to the address of the second virtual machine 1232, the first virtual port corresponding to the second virtual machine 1232 and determine an address of the first share memory corresponding to the second virtual machine 1232; send a reply message containing the address of the first share memory to the second virtual machine 1232 through the second virtual port corresponding to the I/O device 1211; and, when a writing completion interrupt, which indicates, to the first virtual machine 1231, that the I/O device 1211 has written the to-be-switched data into the first share memory and is sent by the I/O device 1211, is received, determine the second message containing a reading instruction and send the second message to the second virtual machine 1232 through the first virtual port; the I/O device 1211 is further configured to write the to-be-switched data into the first share memory according to the address of the first share memory in the reply message; the I/O device 1211 is further configured to send the writing completion interrupt indicating that the I/O device 1211 has written the to-be-switched data into the first share memory to the first virtual machine 1231; and the second virtual machine 1232 is configured to read the to-be-switched data from the first share memory according to the second message.

Specifically, as an example of exchange between a data flow and a signaling flow, when both the source node and the target node are common virtual machines in the at least one virtual machine 1230, and it is assumed that the source node is the second virtual machine 1232 and the target node is a third virtual machine 1233, the second virtual machine 1232 is further configured to write the to-be-switched data into second share memory that the second virtual machine 1232 pre-negotiates, through the first virtual machine 1231, with the third virtual machine 1233, where the second share memory is a specified storage area on the storage device 1212 of the hardware layer 1210; the second virtual machine 1232 is further configured to send the first message to the first virtual machine through the first virtual port, where the first message includes a writing completion interrupt; the first virtual machine 1231 is specifically configured to determine, according to the first virtual port used to receive the first message, an address of the corresponding second virtual machine 1232; determine an address of the second share memory according to the address of the second virtual machine 1232 and the address of the third virtual machine 1233 contained in the to-be-switched data; and determine the second message containing the address of the second share memory and a reading instruction, and send the second message to the third virtual machine 1233; and the third virtual machine 1233 is configured to read the to-be-switched data from the second share memory according to the second message.

Optionally, as an embodiment, after the third virtual machine 1233 (i.e. the target node) reads the to-be-switched data from the share memory according to the second message, the third virtual machine 1233 may send reading completion indication information to the first virtual machine 1231, so as to release the first share memory or the second share memory. After receiving the reading completion indication information, the first virtual machine 1231 releases the first share memory or the second share memory.

Specifically, the first virtual machine 1231 acquires, from the I/O device 1211, the address of the third virtual machine 1233 contained in the to-be-switched data as follows. The first virtual machine 1231 learns, after receiving a notification of the first message, that the I/O device 1211 (namely, an underlying physical network interface card) receives the to-be-switched data. After that, the first virtual machine 1231 may directly access the to-be-switched data through a driver layer, so as to acquire the address of the third virtual machine 1233 contained in the to-be-switched data.

Optionally, when the port mapping table is an Openflow flowtable, after receiving the first message sent by the I/O device 1211 (i.e. the source node), the first virtual machine 1231 is further configured to determine, according to the address of the third virtual machine 1233 (i.e. the target node) contained in the to-be-switched data, an entry matching the address of the third virtual machine 1233 in the configured Openflow flowtable, where the Openflow flowtable includes at least one entry and the entry includes an address, a virtual port, and an execution action parameter; if the matched entry exists, process the to-be-switched data according to the execution action parameter, which is in the matched entry, corresponding to the address of the third virtual machine 1233; and if the matched entry does not exist, create a new entry that can match the to-be-switched data and insert the new entry into the Openflow flowtable.

To sum up, the computing node 1200 according to the embodiment of the present invention may include a hardware layer 1210, a Host 1220 running on the hardware layer 1210, and at least one virtual machine (VM) 1230 running on the Host 1220, where the hardware layer includes an input/output (I/O) device 1211 and a storage device 1212, the at least one virtual machine (VM) includes a first virtual machine 1231 having a virtual switching function, and the at least one VM further includes a second virtual machine 1232. In this way, by implementing the virtual switching function on the virtual machine, the virtual switch has a same priority as a common VM, so as to form a peer network virtualization architecture. During resource allocation, the virtual switch uses a physical resource in user space like the common VM, which facilitates the Host to perform management and efficiently and reasonably allocate a bandwidth, CPU, or storage resource.

A virtual switching method applied to the computing node includes receiving, by the first virtual machine 1231, a first message sent by a source node, where the first message is used to request the first virtual machine to perform switching processing on to-be-switched data, where the to-be-switched data is sent from the source node to a target node and at least one of the source node and the target node is the second virtual machine 1232; and determining, by the first virtual machine, a second message according to an address of the target node contained in the to-be-switched data and a configured port mapping table, and sending the second message, where the second message is used to instruct the target node to acquire the to-be-switched data from the storage device of the hardware layer. According to the method, the virtual switching function is separated and decoupled from a Host kernel, which decreases a degree of coupling with the Host and allows deployment of a plurality of vSwitches on a same Host without being restricted by the Host, thereby featuring more powerful scalability. After decoupling, the vSwitch does not depend on an operating system in the Host kernel any longer and can be deployed more easily, thereby featuring better transplantability. In addition, a configuring module (Agent) is separated from a to-be-switched data switching and forwarding module (a port mapping table), thereby better meeting a requirement of a software-defined network.

Figure 13:
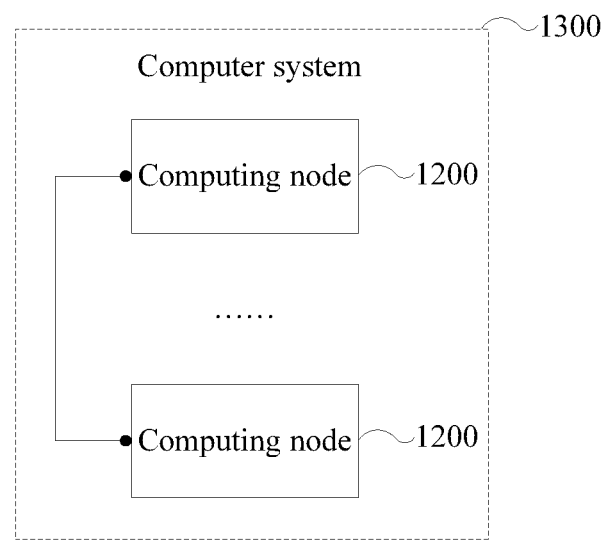
FIG. 13 is a schematic diagram of a computer system according to an embodiment of the present invention.

FIG. 13 is a schematic diagram of a computer system according to an embodiment of the present invention. Referring to FIG. 13, the embodiment of the present invention further provides a computer system 1300. The computer system 1300 may include at least one computing node 1200.

It should be noted that, for ease of description, the foregoing method embodiments are represented as a series of action combinations, but a person skilled in the art should know that the present invention is not limited to a sequence of the described actions because some steps may be performed in another order or concurrently according to the present invention. Secondly, a person skilled in the art should also know that the embodiments described in the specification are exemplary embodiments and the involved actions and modules are not necessarily required in the present invention.

In the foregoing embodiments, the description of each of the embodiments has respective focuses. For a part that is not described in detail in an embodiment, reference may be made to relevant descriptions in other embodiments.

To sum up, a computing node 1200 in the computer system 1300 according to the embodiment of the present invention may include a hardware layer, a Host running on the hardware layer, and at least one virtual machine (VM) running on the Host, where the hardware layer includes an input/output (I/O) device and a storage device, the at least one VM includes a first virtual machine having a virtual switching function, and the at least one VM further includes a second virtual machine. In this way, by implementing the virtual switching function on the virtual machine, the virtual switch has a same priority as a common VM, so as to form a peer network virtualization architecture. During resource allocation, the virtual switch uses a physical resource in user space like the common VM, which facilitates the Host to perform management and efficiently and reasonably allocate a bandwidth, CPU, or storage resource. A virtual switching method applied to the computing node 1200 includes: receiving, by the first virtual machine, a first message sent by a source node, where the first message is used to request the first virtual machine to perform switching processing on to-be-switched data, where the to-be-switched data is sent from the source node to a target node and at least one of the source node and the target node is the second virtual machine; and determining, by the first virtual machine, a second message according to an address of the target node contained in the to-be-switched data and a configured port mapping table, and sending the second message, where the second message is used to instruct the target node to acquire the to-be-switched data from the storage device of the hardware layer. According to the method, the virtual switching function is separated and decoupled from a Host kernel, which decreases a degree of coupling with the Host and allows deployment of a plurality of vSwitches on a same Host without being restricted by the Host, thereby featuring more powerful scalability. After decoupling, the vSwitch does not depend on an operating system in the Host kernel any longer and can be deployed more easily, thereby featuring better transplantability. In addition, a configuring module (Agent) is separated from a to-be-switched data switching and forwarding module (a port mapping table), thereby better meeting a requirement of a software-defined network.

A person of ordinary skill in the art may be aware that, in combination with the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may be placed in a random access memory (RAM), memory, a read-only memory (ROM), an electrically programmable ROM, an electrically erasable programmable ROM, a register, a hard disk, a removable disk, a compact disc (CD)-ROM, or any other form of storage medium publicly known in the art.

Although the present invention is described in detail with reference to accompanying drawings and exemplary embodiments, the present invention is not limited thereto. A person of ordinary skill in the art may make various equivalent modifications or replacements to the embodiments of the present invention without departing from the spirit and essence of the present invention, and these modifications or replacements should fall within the protection scope of the present invention.

What is claimed is:

1. A virtual switching method, wherein the method is for use by a computing node and the computing node comprises a hardware layer, a host running on the hardware layer, and one or more virtual machines (VMs) running on the host, wherein the hardware layer comprises an input/output (I/O) device and a storage device, wherein the one or more VMs comprise a first VM having a virtual switching function, and a second VM, and wherein the method comprises:
    receiving, by the first VM, a first message from a source node, wherein the first message instructs the first VM to handle a switch of data from the source node to a target node, wherein the first message does not contain the data, and wherein the second VM is the source node or the target node;
    forming, by the first VM, a second message according to an address of the target node contained in the data and a configured port mapping table; and sending, by the first VM, the second message to the target node, wherein the second message instructs the target node to acquire the data from the storage device of the hardware layer.

2. The method according to claim 1, wherein before receiving, by the first VM, the first message from the source node, the method further comprises:
  receiving, by the first VM, a configuration command from the host;
  configuring, by the first VM according to the configuration command, a first virtual port of the first VM and a second virtual port of the first VM, wherein the first virtual port is used by the first VM to communicate with the second VM, and wherein the second virtual port is used by the first VM to communicate with the I/O device; and
  establishing, by the first VM, a mapping relationship between the first virtual port and the second virtual port and generate the port mapping table.

3. The method according to claim 2, wherein after receiving the configuration command from the host, the method further comprises configuring, by the first VM according to the configuration command, a first shared memory corresponding to the second VM, and wherein the first shared memory is a specified storage area in the storage device of the hardware layer.

4. The method according to claim 3, wherein the source node is the second VM and the target node is the I/O device, wherein receiving, by the first VM, the first message from the source node comprises receiving, by the first VM, the first message from the second VM through the first virtual port, wherein the first message comprises a writing completion interrupt which indicates, to the first VM, that the second VM has written the data into the first shared memory,
  wherein forming, by the first VM, the second message according to the address of the target node contained in the data and the port mapping table comprises:
    determining, by the first VM, an address of the first shared memory according to the first virtual port used to receive the first message;
    acquiring the data from the first shared memory;
    determining, according to an address of the I/O device contained in the data, the second virtual port corresponding to the I/O device from the port mapping table; and
    forming the second message containing the address of the first shared memory and a reading instruction, and
  wherein sending, by the first VM, the second message to the target node comprises sending, by the first VM, the second message to the I/O device through the second virtual port, which instructs the I/O device to read the data from the first shared memory.

5. The method according to claim 4, wherein the method further comprises:
  receiving, by the first VM, a reading completion indication from the I/O device; and
  releasing the first shared memory.

6. The method according to claim 3, wherein the source node is the I/O device and the target node is the second VM, wherein the method further comprises:
  acquiring, by the first VM from the I/O device, an address of the second VM contained in the data after receiving the first message, wherein forming, by the first VM, the second message according to the address of the target node contained in the data and the configured port mapping table comprises:
    determining, by the first VM by querying the port mapping table according to the address of the second VM, the first virtual port corresponding to the second VM and determining an address of the first shared memory;
  sending, by the first VM through the second virtual port, a reply message containing the address of the first shared memory to the I/O device, which instructs the I/O device to write the data into the first shared memory according to the reply message; and
  forming the second message containing a reading instruction when the first VM receives, from the I/O device, a writing completion interrupt which indicates that the I/O device has written the data into the first shared memory, and
  wherein sending, by the first VM, the second message to the target node comprises sending, by the first VM through the first virtual port, the second message to the second VM, which instructs the second VM to read the data from the first shared memory.

7. The method according to claim 6, wherein the method further comprises receiving, by the first VM, a reading completion indication from the second VM and releasing a second shared memory.

8. The method according to claim 2, wherein the one or more VMs further comprise a third VM, wherein the source node is the second VM and the target node is the third VM, wherein receiving, by the first VM, the first message from the source node comprises receiving, by the first VM through the first virtual port, the first message from the second VM, wherein the first message comprises a writing completion interrupt which indicates that the second VM has written the data into a second shared memory, wherein the second shared memory is pre-negotiated by the second VM with the third VM through the first VM, wherein the second shared memory is a specified storage area in the storage device of the hardware layer, wherein forming, by the first VM, the second message according to the address of the target node contained in the data and the port mapping table comprises:
    determining, by the first VM according to the first virtual port used to receive the first message, an address of the second VM corresponding to the first virtual port;
    determining, by the first VM, an address of the second shared memory according to the address of the second VM and an address of the third VM contained in the data; and
    forming, by the first VM, the second message containing the address of the second shared memory and a reading instruction, and
  wherein sending, by the first VM, the second message to the target node comprises sending, by the first VM, the second message to the third VM, which instructs the third VM to read the data from the second shared memory.

9. The method according to claim 1, wherein the port mapping table is an Openflow flowtable, wherein the Openflow flowtable comprises at least one entry, wherein the entry comprises an address, a virtual port, and an execution action parameter, and wherein after receiving, by the first VM, the first message from the source node, the method further comprises:
    determining, by the first VM according to the address of the target node contained in the data, whether an entry matching the address of the target node exists in the Openflow flowtable;

processing, by the first VM, the data according to the execution action parameter in the matching entry when the entry matching the address of the target node exists; and creating, by the first VM, a new entry in the Openflow flowtable that matches the data with the address of the target node when the entry matching the address of the target node does not exist.

10. A computing node, comprising:
a hardware layer comprising an input/output (I/O) device and a storage device;
a host running on the hardware layer; and
one or more virtual machines (VMs) running on the host, wherein the one or more VMs comprise a first VM having a virtual switching function and a second VM,
wherein the first VM is configured to:
  receive a first message from a source node, wherein the first message instructs the first VM to handle a switch of data from the source node to a target node, wherein the first message does not contain the data and wherein the second VM is the source node or the target node,
  form a second message according to an address of the target node contained in the data and a configured port mapping table; and
  send the second message to the target node, wherein the second message instructs the target node to acquire the data from the storage device of the hardware layer.

11. The computing node according to claim 10, wherein the first VM is further configured to:
  receive a configuration command from the host before receiving the first message from the source node;
  configure, according to the configuration command, a first virtual port of the first VM and a second virtual port of the first VM, wherein the first virtual port is used by the first VM to communicate with the second VM, and the second virtual port is used by the first VM to communicate with the I/O device; and
  establish a mapping relationship between the first virtual port and the second virtual port and generate the port mapping table.

12. The computing node according to claim 11, wherein the first VM is further configured to configure, according to the configuration command, a first shared memory corresponding to the second VM after receiving the configuration command from the host, and wherein the first shared memory is a specified storage area in the storage device of the hardware layer.

13. The computing node according to claim 12, wherein the source node is the second VM and the target node is the I/O device, wherein in receiving the first message from the source node, the first VM is configured to receive the first message from the second VM through the first virtual port, wherein the first message comprises a writing completion interrupt which indicates, to the first VM, that the source node has written the data into the first shared memory, wherein in forming the second message according to the address of the target node contained in the data and the port mapping table, the first VM is configured to:
  determine an address of the corresponding first shared memory according to the first virtual port used to receive the first message;
  acquire the data from the first shared memory;
  determine, according to an address of the I/O device contained in the data, the second virtual port from the port mapping table; and form the second message containing the address of the first shared memory and a reading instruction, and
wherein in sending the second message to the target node, the first VM is configured to send the second message to the to the I/O device through the second virtual port, which instructs the I/O device to read the data from the first shared memory.

14. The computing node according to claim 13, wherein the first VM is further configured to:
  receive a reading completion indication to the first VM; and
  release the first shared memory.

15. The computing node according to claim 13, wherein the first VM is further configured to receive a reading completion indication from the second VM and release a second shared memory.

16. The computing node according to claim 12, wherein the source node is the I/O device and the target node is the second VM, wherein the first VM is further configured to acquire an address of the second VM contained in the data after receiving the first message, wherein in forming the second message according to the address of the target node contained in the data and the configured port mapping table, the first VM is configured to:
  determine, by querying the port mapping table according to the address of the second VM, the first virtual port corresponding to the second VM and determine an address of the first shared memory;
  send a reply message containing the address of the first shared memory to the I/O device through the second virtual port, which instructs the I/O device to write the data into the first shared memory according to the reply message; and
  form the second message containing a reading instruction after receiving a writing completion interrupt that indicates that the I/O device has written the data into the first shared memory, and
  wherein in sending the second message to the target node, the first VM is configured to send, through the first virtual port, the second message to the second VM, which instructs the second VM to read the data from the first shared memory.

17. The computing node according to claim 11, wherein the one or more VMs further comprise a third VM, wherein the source node is the second VM, wherein the target node is the third VM, wherein the second VM is further configured to:
  write the data into a second shared memory, wherein the second shared memory is pre-negotiated by the second VM with the third VM through the first VM, wherein the second share memory is a specified storage area in the storage device of the hardware layer; and
  send the first message to the first VM through the first virtual port,
  wherein the first message comprises a writing completion interrupt,
  wherein in forming the second message according to the address of the target node contained in the data and the configured port mapping table, the first VM is configured to:
    determine, according to the first virtual port used to receive the first message, an address of the source node corresponding to the first virtual port;
    determine an address of the second shared memory according to the address of the second VM and the address of the third VM contained in the data; and form the second message containing the address of the second shared memory and a reading instruction, wherein in sending the second message to the target node, the first VM is configured to send the second message to the third VM, for instructing the third VM to read the data from the second shared memory, and wherein the third VM is configured to read the data from the second shared memory according to the second message.

18. The computing node according to claim 10, wherein the port mapping table is an Openflow flowtable, wherein the Openflow flowtable comprises at least one entry, wherein the entry comprises an address, a virtual port, and an execution action parameter, and wherein after receiving the first message from the source node, the first VM is further configured to:

determine, according to the address of the target node contained in the data, whether an entry matching the address of the target node exists in the Openflow flowtable;

process the data according to the execution action parameter in the matching entry when the entry matching the address of the target node exists; and create a new entry in the Openflow flowtable that matches the data with the address of the target node when the entry matching the address of the target node does not exist.

* * * * *